May 21, 1963    A. C. MAMO    3,090,252
FLOATING MEMBER INFINITELY VARIABLE TRANSMISSION
Filed Feb. 4, 1959    9 Sheets-Sheet 5

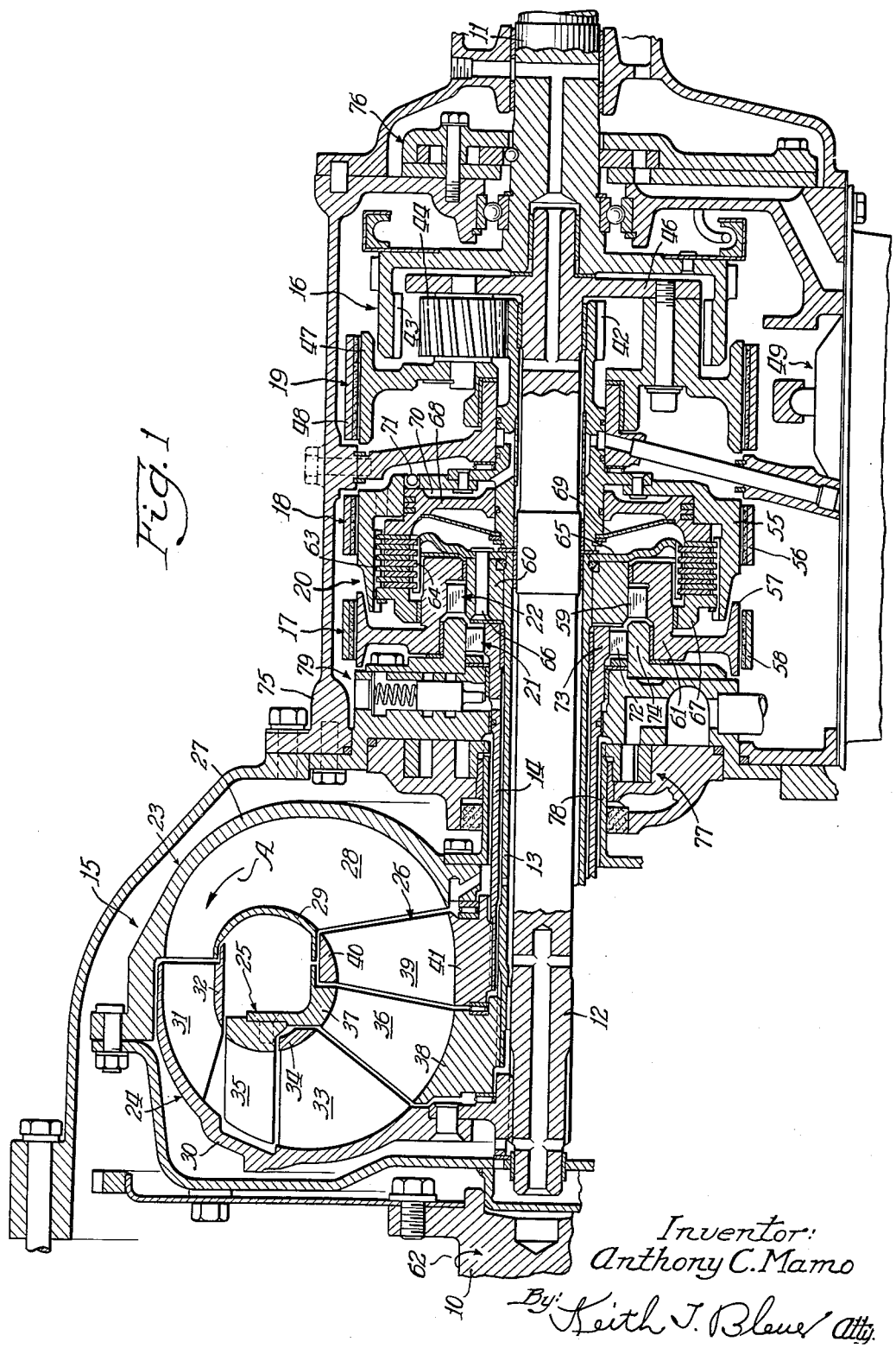

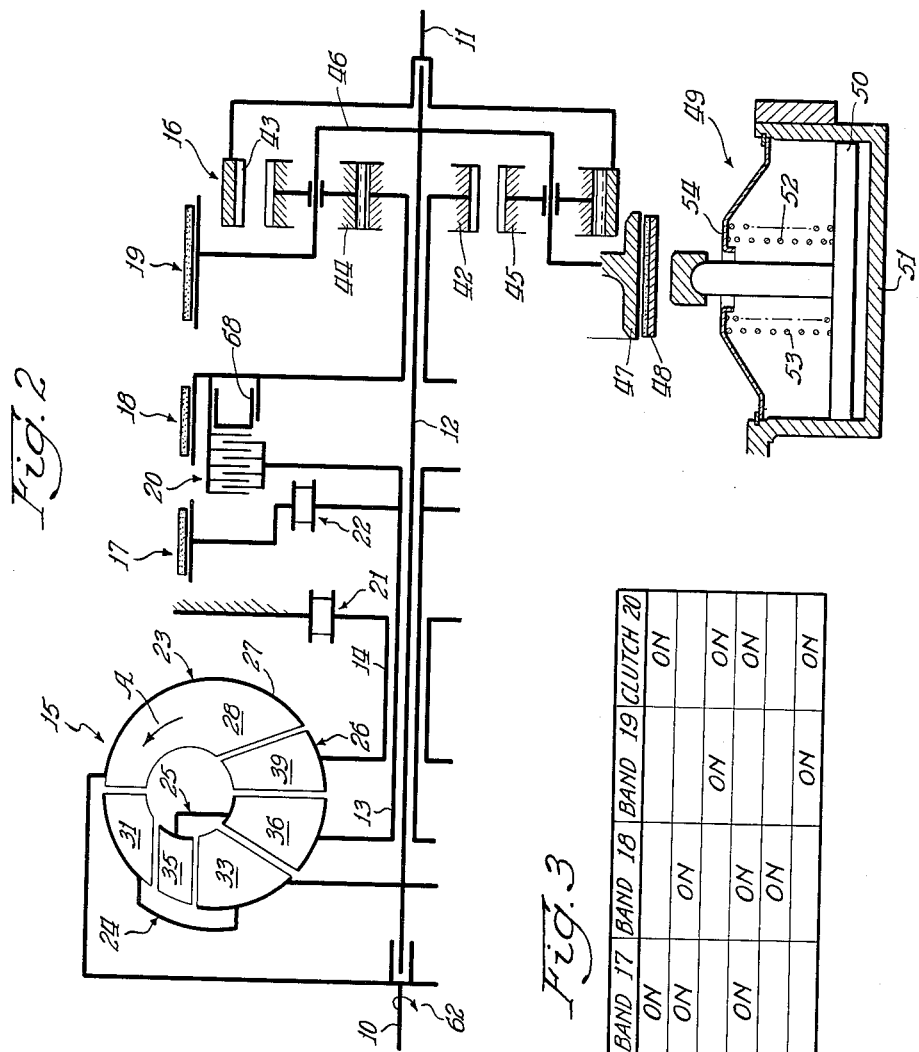

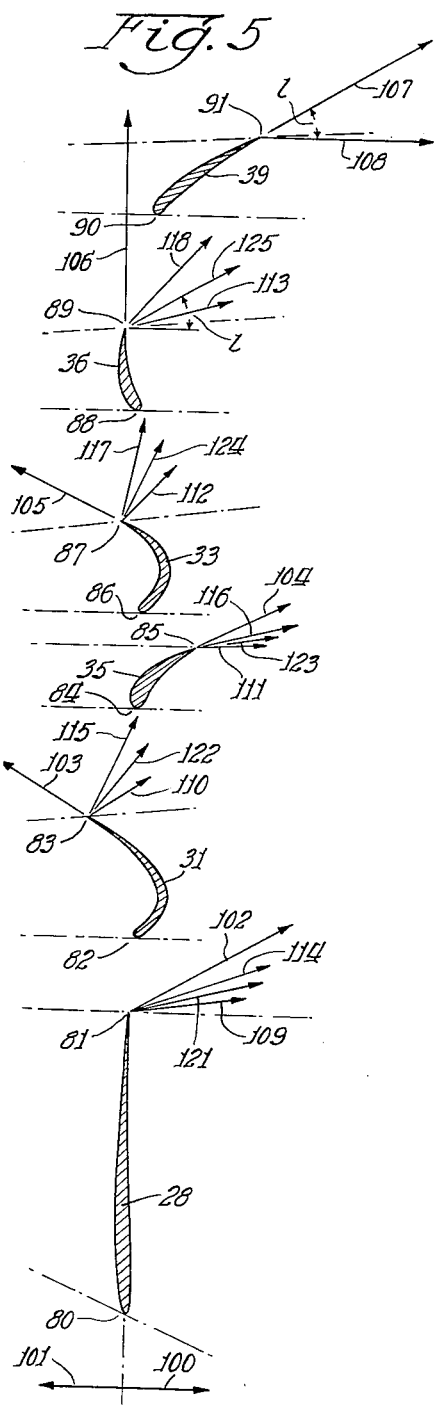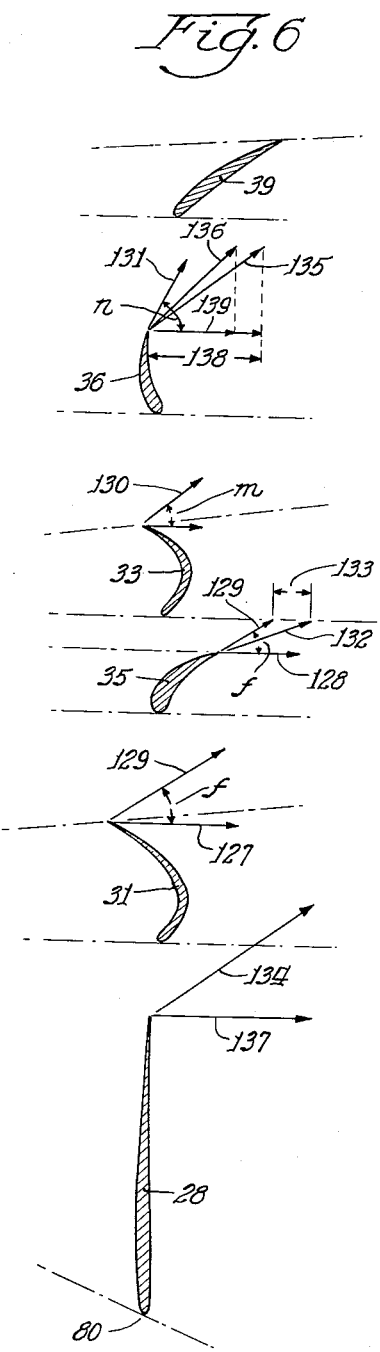

Inventor:
Anthony C. Mamo
By: Keith J. Bleuer Atty.

May 21, 1963 — A. C. MAMO — 3,090,252
FLOATING MEMBER INFINITELY VARIABLE TRANSMISSION
Filed Feb. 4, 1959 — 9 Sheets-Sheet 6

Inventor:
Anthony C. Mamo
By: Keith J. Bleus, Atty.

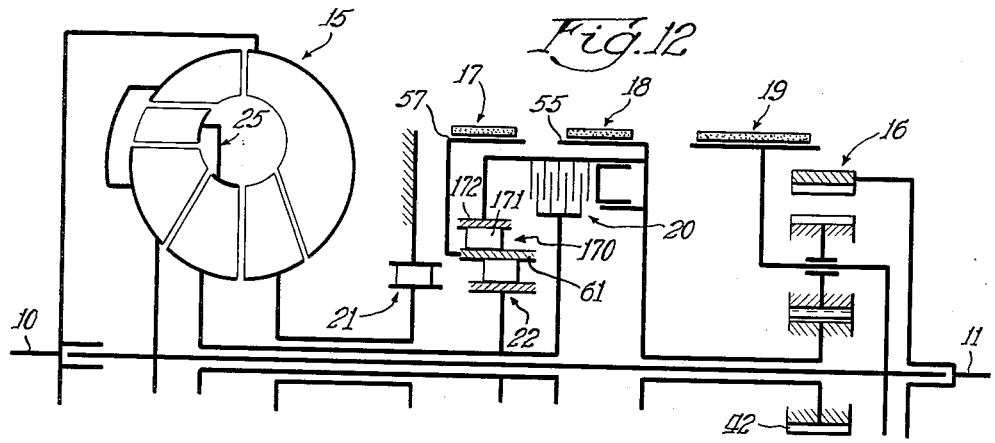
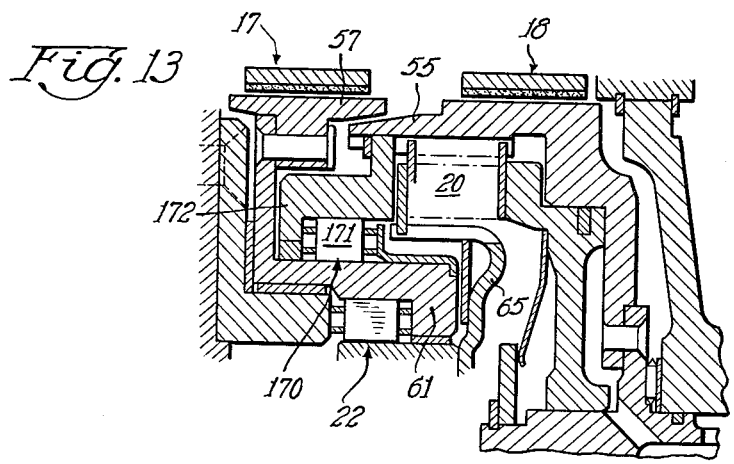
| | BAND 17 | CLUTCH 20 | BAND 18 | BAND 19 |
|---|---|---|---|---|
| REVERSE | | ON | | ON |
| DRIVE | ON | ON | | |
| Performance Kick-down | ON | | | |
| Performance Hand Shift | ON | | ON | |
| GRADE RET. 2 | ON | ON | ON | |
Inventor:
Anthony C. Mamo
By: Keith J. Bleur Atty.

May 21, 1963 A. C. MAMO 3,090,252
FLOATING MEMBER INFINITELY VARIABLE TRANSMISSION
Filed Feb. 4, 1959 9 Sheets-Sheet 9

Inventor:
Anthony C. Mamo
By: Keith J. Bleuer Atty.

United States Patent Office 3,090,252
Patented May 21, 1963

3,090,252
FLOATING MEMBER INFINITELY VARIABLE TRANSMISSION
Anthony C. Mamo, Des Plaines, Ill., assignor to Borg-Warner Corporation, Chicago, Ill., a corporation of Illinois
Filed Feb. 4, 1959, Ser. No. 791,192
6 Claims. (Cl. 74—677)

My invention relates to transmissions for use in automotive vehicles and more particularly to transmissions of this type utilizing hydraulic torque converters.

It is an object of the present invention to provide an improved hydraulic torque converter particularly suitable in automotive transmissions having a relatively high torque ratio, such as on the order of 3.5, at stall (at zero speed ratio) and which has a relatively high "clutch point", such as above .9 speed ratio, at which the stator or bladed reaction element of the torque converter begins to move in the forward direction.

It is also an object of the invention to provide an improved hydraulic torque converter which, although providing a relatively high torque multiplication at stall, has a rising $k$ curve, rather than a drooping $k$ curve, throughout the complete range of speed ratios. The value of $k$ is defined as input speed of the converter divided by the square root of the input torque. It is contemplated that by such an improved form of $k$ curve, the hydraulic torque converter, and the transmission as a whole of which the converter is a part, may be better matched against and with the usual automotive vehicle engine which has a torque curve that rises to a high point at intermediate engine speeds causing the engine speeds to be maintained for longer periods of time at their high torque points as the vehicle is accelerated.

It is also an object of the invention to provide an improved torque converter which, although it provides a high torque ratio at stall, nevertheless has a low degree of slip in its coupling range.

It is a more specific object of the invention, particularly in attaining the results above mentioned, to provide an improved hydraulic torque converter having, in addition to the usual three converter elements, impeller, turbine and stator, also a fourth element which may be termed a "floater member". It is contemplated that preferably the turbine shall be split, having two bladed portions and that the floater member shall also be split and have two bladed portions, with the two bladed floater portions embracing one of the bladed turbine portions.

It is another object of the invention to provide an improved transmission utilizing such an improved torque converter as has been referred to above, with a fourth or floater member of the converter being utilized to drive one input element of a planetary gear set and the turbine being connected to drive a second input member of the gearing whereby the third member of the gearing may drive the driven shaft to the transmission. It is also an object to provide selectively operable one way engaging brake mechanisms in connection with the floater member so that the floater member may be held from reverse rotation to cause the floater member to initially act as a reaction member in the torque converter and so that the floater member may subsequently float within the torque converter at a slower speed than the impeller for changing the characteristics of the torque converter and lengthening the torque ratio curve to provide the above mentioned high torque ratio and extended clutch point.

The invention consists of the novel constructions, arrangements and devices to be hereinafter described and claimed for carrying out the above stated objects and such other objects as will appear from the following description of preferred embodiments of the invention, illustrated with reference to the accompanying drawings, wherein:

FIG. 1 is a longitudinal sectional view of a transmission embodying the principles of the invention;

FIG. 2 is a schematic illustration of the transmission;

FIG. 3 is a table setting forth the various engaging devices of the transmission that are engaged for obtaining various driving conditions through the transmission;

FIG. 5 is a view of the converter blades on their mean flow lines showing fluid vectors obtained during a performance range;

FIG. 6 is a view similar to FIG. 5 but showing fluid vectors obtained at higher operating speeds during performance range;

FIG. 12 is a schematic view of a modified form of the transmission;

FIG. 13 is a partial longitudinal sectional view of the FIG. 12 form of the invention;

FIG. 14 is a table illustrating the various driving conditions obtainable in the FIG. 12 modification with engagement of the various engaging devices of the transmission;

Like characters of reference designate like parts in the several views.

Figure 4:
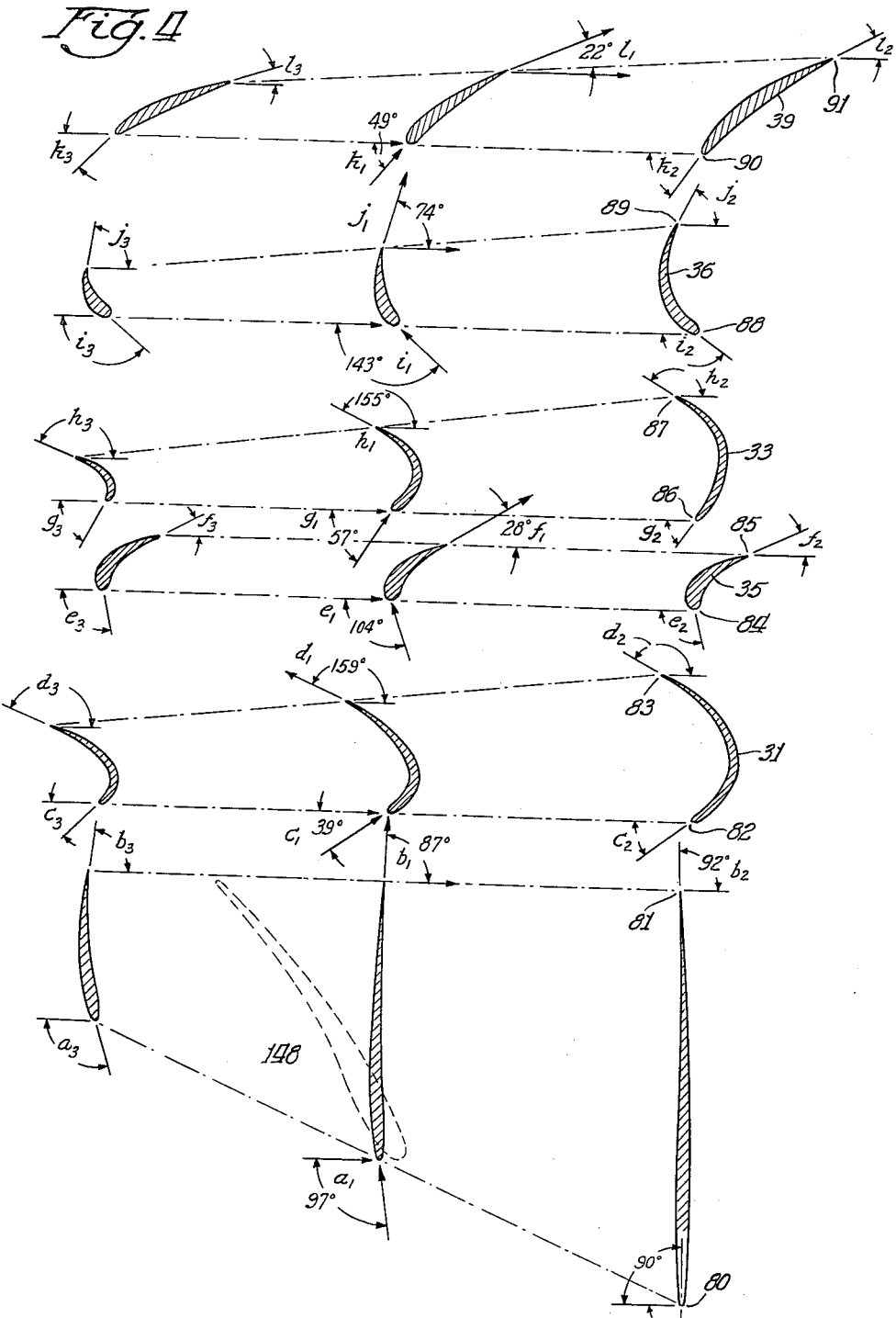
FIG. 4 is sectional views of the various blades in the hydraulic converter of the transmission taken on their inner and outer edges and also on their mean flow lines.

Referring now to FIGS. 1 and 2 of the drawings, the illustrated transmission may be seen to comprise generally a drive shaft 10, a driven shaft 11, intermediate shafts 12, 13, and 14, a hydraulic torque converter 15, a planetary gear set 16, friction brakes 17, 18, and 19, a friction clutch 20, and one-way brakes 21 and 22. This transmission is particularly suitable for use in an automotive vehicle, and, in this case, the drive shaft 10 is driven from the vehicle engine (not shown), and the driven shaft 11 is connected in driving relation with the rear driving road wheels of the vehicle through the conventional propeller shaft and differential (not shown).

The hydraulic torque converter 15 comprises an impeller 23, a turbine 24, a floater member 25, and a stator 26. The impeller 23 comprises an outer converter shell 27 which is connected to the drive shaft 10, vanes 28 and an inner core section 29. The turbine 24 comprises an outer shell 30 fixed with respect to the intermediate shaft 12, a first or outer set of blades 31, an inner shell section 32 fixed to the blades 31, a second or inner set of blades 33 fixed within the shell 30 and an inner core section 34 fixed to the blades 33. The floater member 25 comprises a first or outer set of blades 35 and a second or inner set of blades 36. The blades 35 and 36 are fixed with respect to an inner shell portion 37, and the blades 36 are formed within a hub 38 which is splined on to the intermediate shaft 13. The stator 26 is formed of blades 39, an inner shell section 40 fixed with respect to the blades 39 and a hub 41 formed integrally with the blades 39 and which is splined to the shaft 14. The converter 15 is filled with fluid, and the fluid normally flows in a generally circular direction toroidally within the shells 27 and 30 as indicated by the arrows A. The shells 27 and 30 and hubs 38 and 41 are outwardly disposed with respect to this movement of fluid while the cores 29, 32, 34, 37, and 40 are inwardly disposed with respect to the fluid path, as is apparent.

The impeller 23, the turbine 24, the floating member 25 and the stator 26 all rotate about the longitudinal center line of the center shaft 12; and with respect to this center line, it will be observed that the turbine blades 31 are farthest outwardly disposed while the floating member blades 36 and stator blades 39 are inwardly disposed. The floating member blades 35 and turbine blades 13 are intermediately disposed, and the impeller blades extend from the inner portion of the fluid circuit to the outer portion. It will be observed that the fluid flowing as indicated by the arrows A passes outwardly from the impeller blades 28 and successively through the turbine blades 31, the floating member blades 35, the turbine blades 33, the floating member blades 36, and the stator blades 39 back into the impeller blades 28.

The planetary gear set 16 comprises a sun gear 42, a ring gear 43, a set of planet gears 44 each in mesh with the sun gear 42, a set of planet gears 45 each in mesh with one of the planet gears 44 and with the ring gear 43 and a carrier 46 for the planet gears. The ring gear 43 is fixed with respect to the driven shaft 11, and the carrier 46 is fixed with respect to the center shaft 12. The sun gear 42 is rotatably disposed on the center shaft 12, as shown.

The brake 19 comprises a brake drum 47 forming a part of the carrier 46 and a friction band 48 engageable with the drum 47. The band 48 may be contracted on the drum 47 by means of any suitable motor mechanism 49 which may comprise a fluid pressure actuated piston 50 slidably disposed in a cylindrical casing 51. The piston 50 acts against springs 52 and 53 disposed between the piston and a spring retainer 54 anchored with respect to the casing 51.

The brake 18 comprises a brake drum 55 fixed with respect to the sun gear 42 and a brake band 56 engageable on the outer periphery of the drum 55. The brake 18 may be actuated by a fluid pressure motor similar to the motor 49 for the brake 19.

The friction brake 17 comprises a brake drum 57 engageable by a friction band 58. The brake 17 may likewise be actuated by a fluid pressure motor similar to the motor 49. The brake 17 is connected to the one way brake 22 which in turn is connected to the shaft 13. The one way brake 22 may be of any conventional construction and, as shown, comprises tiltable grippers 59 disposed between and engageable with inner and outer races 60 and 61. The race 60 is fixed on the shaft 13, and the outer race 61 is rotatably disposed on the part 60 and has the drum 57 splined on to it. The tiltable sprags 59 are so disposed between the races 60 and 61 that the sprags will restrain the inner race 60 from reverse rotation (rotation in a direction reverse to that of the drive shaft 10 and which is indicated by the arow 62) but will allow free rotation of the race 60 in the opposite or forward direction.

The clutch 20 comprises a set of friction plates 63 splined within the drum 55 and a set of interleaved friction plates 64 splined on to a sheet metal shell 65 which is fixed with respect to the inner race 60 by means of rivets 66. A backing plate 67 is fixed within the drum 55, and a fluid pressure actuated piston 68 is slidably disposed within the drum 55 on the other side of the stacked plates 63 and 64. A Belleville spring 69 is fixed with respect to the hub of the sun gear 42 and acts on the piston 68 for returning it into its clutch disengaging position. Fluid under pressure is adapted to be supplied behind the piston 68 within a cavity 70 through any suitable ducts, and a check valve 71 is provided in communication with the cavity 70 for relieving fluid pressure from the cavity 70 when fluid is not supplied through the ducts.

The one way brake 21 is also of conventional construction and may comprise tiltable grippers 72 positioned between an inner race surface 73 formed on the shaft 14 and an outer race member 74. The member 74 is fixed with respect to the casing 75 of the transmission, and the grippers 72 are so disposed between the race surface 73 and race member 74 that the shaft 14 is prevented from reverse rotation but may freely rotate in the forward direction.

The fluid pressure for engaging the brakes 17, 18, and 19 and the clutch 20 may be supplied and controlled by means of any suitable hydraulic system. The system may comprise a pump 76 of any suitable construction driven by the driven shaft 11 of the transmission and a pump 77 also of any suitable construction driven from the drive shaft 10 through the shell 27 and a sleeve shaft 78. The hydraulic system may also comprise a relief valve 79 of any suitable construction for relieving excess pressure within the hydraulic torque converter 15.

FIG. 4 will now be referred to for a more detailed disclosure of the blades in the converter 15. This figure shows, in a center column, sectional views of the blades of the converter taken on a mean flow line (the mean flow line being defined as the lines on the blades having approximately the same area of flow inside as compared to outside of the line, that is, from the line toward the inner shells 29, 32, 34, 37, and 40, or from the line toward the outer shells, namely, the shells 27 and 34 and hubs 38 and 41). On the left side in this figure, the blades are shown in section at their inner ends, at the cores 29, 32, 34, 37, and 40; and on the right side of the figure, these blades are shown at their outer edges, namely, along the shells 27 and 30 and the hubs 38 and 41.

It will be observed that the impeller blades 28 have inlet ends 80 and outlet ends 81. Similarly the first turbine blades 31 have inlet and outlet ends 82 and 83 respectively; the first floater blades 35 have inlet and outlet ends 84 and 85 respectively; the second turbine blades 33 have inlet and outlet ends 86 and 87 respectively; the second floater blades 36 have inlet and outlet ends 88 and 89 respectively; and the stator blades 39 have inlet and outlet ends 90 and 91 respectively. These blades at their ends have certain preferred angles with respect to their directions of rotation.

Each of these angles is measured in accordance with system B of the SAE standards (see the Society of Automotive Engineers handbook for 1957, page 959). Very briefly, according to this system, at the inlet ends of the blades, the vectors representing the direction of rotation of the blade carrying element and the fluid flow direction (or the angle of the blade at its inlet edge) converge, that is, the arrows of the vectors meet and the angle is measured between these vectors. The vectors representing the direction of the rotation of the blade element and the outlet angle or exit fluid flow diverge at the exit ends of the blades, and the outlet angles are measured between these vectors.

The angles on the blade ends at the mean flow lines of the blades are indicated as $a_1$ and $b_1$ for the impeller 28 at its inlet and outlet ends 80 and 81 similarly $c_1$ and $d_1$ for the first turbine blades 31, $e_1$ and $f_1$ for the first floater blades 35, $g_1$ and $h_1$ for the second turbine blades 33, $i_1$ and $j_1$ for the second floater blades 36, and $k_1$ and $l_1$ for the stator blades 39.

The angles for these blades at their shell sections (that is at the shells 27 and 30 and the hubs 38 and 41) are indicated by the same designations but with the subscript 2; for example, the inlet and outlet angles of the impeller blades 28 are indicated respectively by $a_2$ and $b_2$. The angles for these blades at their core sections (that is, on the inner cores 29, 32, 34, 37 and 40) are indicated by the same designations but with the subscript 3; for example, the inlet and outlet angles of the impeller blades 28 are indicated respectively by $a_3$ and $b_3$.

With respect to the blades of all of the elements 23, 24, 25, and 26 of the converter, the angles on the blade ends of the mean flow lines are approximately midway between the angles of the core and shell ends. For example, in a certain form of the invention, the outlet angle $b_2$ of the blades 28 is 92° and the outlet angle $b_3$ of the blades is 82°. The angle $b_1$ is therefore 87°.

In a certain preferred form of the invention these angles are as follows:

| | | | | | |
|---|---|---|---|---|---|
| $a_3$ | 105° | $a_1$ | 97° | $a_2$ | 90° |
| $b_3$ | 82° | $b_1$ | 87° | $b_2$ | 92° |
| $c_3$ | 43° | $c_1$ | 39° | $c_2$ | 35° |
| $d_3$ | 157° | $d_1$ | 159° | $d_2$ | 152° |
| $e_3$ | 102° | $e_1$ | 104° | $e_2$ | 106° |
| $f_3$ | 28° | $f_1$ | 28° | $f_2$ | 28° |
| $g_3$ | 61° | $g_1$ | 57° | $g_2$ | 54° |
| $h_3$ | 159° | $h_1$ | 155° | $h_2$ | 152° |
| $i_3$ | 140° | $i_1$ | 143° | $i_2$ | 146° |
| $j_3$ | 81° | $j_1$ | 74° | $j_2$ | 67° |
| $k_3$ | 44° | $k_1$ | 49° | $k_2$ | 55° |
| $l_3$ | 19° | $l_1$ | 22° | $l_2$ | 26° |

These angles, however, may be varied, and in particular, the angles at the mean flow lines may have the following ranges:

$a_1$ ———————————————— 45°–145°
$b_1$ ———————————————— 45°–145°
$c_1$ ———————————————— 20°–90°
$d_1$ ———————————————— 100°–160°
$e_1$ ———————————————— 30°–150°
$f_1$ ———————————————— 20°–120°
$g_1$ ———————————————— 20°–125°
$h_1$ ———————————————— 100°–160°
$i_1$ ———————————————— 21°–160°
$j_1$ ———————————————— 25°–145°
$k_1$ ———————————————— 25°–145°
$l_1$ ———————————————— 21°–90°

The corresponding angles of the blades at their inner and outer core sections are of course correspondingly varied.

As will be hereinafter explained, the floater member 25 transmits a substantial percentage of the torque that is transmitted by the turbine 24 for steady state conditions. For one particular gear set 16 that provides a gear ratio of 1.46, for example; with the parts of the gear set 16 all rotating together at about the same speed, the floater member 25 transmits 31.5 percent of the torque while the turbine 24 transmits the additional 68.5 percent. The above ranges of angles (particularly the outlet angles) of the turbine blades 31 and 33 and the floater blades 35 and 36 are considered important in order to effect this torque split, and it is also noteworthy in this connection that the first turbine blades 31 are positioned substantially at the outer periphery of the toroidal fluid circuit and the turbine blades 33 are only separated by the relatively narrow floater blades 35 from the blades 31 at the outer periphery.

In operation, the transmission provides two forward drive ranges, namely, a drive range in which most of the operation of the transmission takes place and a performance range in which greater acceleration is obtained at certain vehicle speeds. A reverse drive is also obtained, and the transmission provides three grade retard conditions in which rotation of the driven shaft 11 of the transmission in the forward direction is retarded. The drive in performance range will first be described.

Referring to the chart of FIG. 3 it will be observed that the two brakes 17 and 18 are engaged for this drive.

The brake 18 is effective on the sun gear 42 and holds it from rotation. The brake 17 is effective through the one way device 22 for holding the floater member 25 against reverse rotation. Under these conditions, the impeller, being driven from the drive shaft 10, causes toroidal movement of the fluid within the converter 15 in the direction indicated by the arrows A, and the fluid impinging on the blades of the turbine 24 drives the turbine 24 at increased torque with respect to the torque on the drive shaft 10, so that the turbine 24 drives the gear set 16 through the center shaft 12 at this increased torque. The floater 25 and the stator 26 initially are both stationary, the floater 25 being held from backward rotation by the brake 17 and one way engaging device 22 and the stator 26 being held from reverse rotation by the one way brake 21. The gear set 16 functions to constantly drive the ring gear 43 and the shaft 11 at a predetermined speed reduction with respect to the center shaft 12 and the carrier 46 fixed to the shaft 12. The sun gear 42 is braked from rotation by the brake 18, and the ring gear rotates at a predetermined reduction in speed and increase in torque determined by the number of teeth of the gears of the gear set 16, this reduction of speed taking place due to the fact that the gear set 16 is of the duplex planetary type having two sets of planet gears 44 and 45 drivingly between the sun gear 42 and the ring gear 43. The gear set 16 may be proportioned so that the reduction is, for example, 1.46—the carrier 46 rotating at 1.46 turns for every single turn of the ring gear 43 and the driven shaft 11.

The increase in torque between the shafts 10 and 11 is therefore the torque multiplication provided by the gear set 16 multiplied by the torque multiplication provided by the torque converter 15, the torque converter 15 being in effect connected in tandem with the gear set 16. Initially, the torque converter 15 provides a relatively high torque multiplication between the shafts 10 and 12, for example on the order of 3½ to 1, and as the speeds of the shafts 12 and 11 increase, the torque conversion provided by the converter 15 gradually decreases. With this increase in speed of the shafts 12 and 11 and gradual decrease in torque conversion by the converter 15, first the floater member 25 begins to rotate in the forward direction with a release of the one way engaging device 22, and subsequently the one way brake 21 releases and the stator 26 rotates forwardly also. When the stator 26 begins rotation in the forward direction, the so-called "clutch point" of the converter 15 has been reached, and the impeller 23 and turbine 24 rotate with only a small slip and the unit 15 then functions as a simple two element fluid coupling, providing no torque multiplication. At this time, all of the torque multiplication between the shafts 10 and 11 is provided by the gear set 16 which functions to continue to drive the shaft 11 at the constant torque multiplication of the gear set 16 with respect to the shaft 12.

The manner in which the fluid flows within the torque converter 15 during performance range will now be described. The driving engine is connected to the impeller 23 through the drive shaft 10 and shell 27, so that the impeller 23 and its blades 28 are driven in the direction indicated by the arrow 100 (see FIG. 5) to cause the fluid to move adjacent and between the blades 28 in the direction indicated by the arrows A. For purposes of further description, the opposite or reverse direction may be indicated by the arrow 101. Initially, before movement of the shaft 12, which at this stage constitutes the sole output shaft of the converter 15, the fluid leaves the exit ends 81 of the blades 28 in the direction indicated by the vector 102. At this time, the force due to the moving fluid within the shell 27 is in the reverse direction 101 on the stator 26 and it is held from reverse rotation (opposite to the direction of rotation 62) by the one way brake 21. The force on the floater member 25 due to the moving fluid within the converter shell 27 is also in the reverse direction, and the floater member is held from reverse rotation due to the friction brake 17 and the one way brake 22 in series with the brake 17. Inasmuch as the shaft 12 has not yet started movement, the turbine 24, is also stationary yet at this time.

As will be noted, the impeller blades 28 are substantially radial, and due to the movement of the blades in the direction 100, the vector 102 is in the positive or forward direction. The fluid leaving the exit edges 81 of the blades 28 in the direction 102 impinges on the first turbine blades 31 which have their entrance ends 82 extending in nearly the same direction as the vector 102, so there is little shock loss at these points. Due to the fact that the turbine 24 is still at rest, it is unable to absorb any but the frictional energy of the fluid leaving the impeller blades 28, and due to the fact that the turbine blades 31 have their entrance ends 82 nearly parallel to the vector 102 and have their exit ends 83 extending rearwardly or in the minus direction 101; the turbine blades 31 redirect the fluid which enters the blades 31 in the forward direction 102, substantially rearwardly as shown by the vector 103.

The fluid leaving the exit ends 83 of the turbine blades 31 impinges on the entrance ends 84 of the first floater blades 35. The blades 35 in general extend forwardly so that their exit edges 85 have only a relatively small angle $f_1$, $f_2$, and $f_3$ with respect to the direction of rotation 100. The floater 25 is also at rest, being held by the brakes 17 and 22. The floater blades 35 therefore are unable to absorb any except frictional energy from the fluid, and the blades 35 act to redirect the fluid leaving the blades 35 substantially in the direction indicated by the vector 104.

The turbine blades 33, which are connected through the shell 30 with the turbine blades 31, are next in the fluid circuit, and these blades are also stationary, initially, along with the turbine blades 31. The blades 33 at their entrance edges have angles approximately in the same direction as the vector 104 but are backwardly bent so that their exit edges 87 are rearwardly directed. The blades 33 in this case also act to redirect the fluid, so that it leaves the blades 33 in the direction substantially as shown by the vector 105.

The floater blades 36 are next in the fluid circuit, and these blades have entrance ends which extend forwardly nearly in the same direction as the vector 105 and have exit ends 89 also extending forwardly but nearly at a right angle $j_1$ with respect to the direction of rotation 100. The floater blades 36 are connected to the blades 35 and are also stationary and they redirect the fluid in a direction substantially as shown by the vector 106.

The entrance edges 90 of the stator blades 39 extend very approximately in the same direction as the vector 106, and the exit edges 91 of the stator blades 39 extend forwardly at a relatively small angle $l_1$—$l_3$ with respect to the direction of rotaton 100 of the impeller 23. The fluid leaving the second floater blades 36 is thus redirected by the stator 26 so as to leave the stator in a direction indicated by the vector 107 which is considerably more in the forward direction (closer to the direction 100) than is the vector 106. The energy left in the fluid after it makes the complete circuit just described is represented by the component vector 108 of the vector 107 which lies in the forward direction, parallel to the direction vector 100. The angular momentum represented by the vector 108 of the fluid leaving the stator blades 39 and entering the impeller blades 28 adds to the energy being supplied by the impeller and thereby provides torque multiplication in the converter, and the first floater blades 35 and the second floater blades 36 act also to redirect the fluid in the forward direction (with a component along the vector 100) so as to provide increased torque multiplication in the converter. All of these blades add a component to the fluid in the forward direction greater than the forward component of the fluid entering the respective blades, whereby the force on these blades is in the reverse direction tending to move the floater member 25 and stator 26 rearwardly so that the one way brakes 21 and 22 are effective.

The fluid impinging on the turbine blades 31 and 33 as represented by the vectors 102 and 104 is substantially in the forward direction (having a substantial component parallel with the vector 100), and the fluid leaving the turbine blades 31 and 33 has a substantial component in the opposite direction (as represented by the vectors 103 and 105), and therefore there is substantial force on the turbine blades 31 and 33 tending to rotate the turbine 24 and the shaft 12 in the forward direction.

As has been explained, in the performance range, the gear set 16 drives the shaft 11 at a constant torque multiplication with respect to the shaft 12, and as the vehicle driven from the shaft 11 begins to move along with the shaft 12 and turbine 24, the direction of flow of fluid within the converter 15 changes. The fluid discharging from the impeller changes more in the forward direction, toward the vector 109 representing the direction of fluid flow from the impeller blades 28 when the converter has finally reached an essentially locked up, fluid coupling condition, that is after all torque conversion in the unit 15 has ceased and the unit 15 is acting as a fluid coupling with both the floater member 25 and the stator 26 rotating freely in the fluid stream, the one way devices 21 and 22 being released at this time. Likewise the fluid from the turbine blades 31 and 33 and the floater blades 35 and 36, with increasing speeds of the turbine 24, discharges more in the forwardly direciton, toward the directions indicated by the vectors 110, 111, 112, and 113 for the blades 31, 35, 33, and 36 respectively, the latter vectors being those for the coupling condition of the converter 15 just mentioned. The fluid discharging from the stator 26 does not change substantially in direction up to the clutch point (which is the point after which the stator 26 releases from its brake 21 and rotates freely in the forward direction); and, subsequently, although the direction of fluid discharged does change from the stator blades 39, nevertheless the stator, after this clutch point, simply floats and has substantially no effect on the converter characteristics. It may be stated incidentally that the fluid velocities in the converter decrease as the converter changes from stall condition to coupling condition; in other words, the circulation velocities of the fluid in the directions indicated by the vectors decrease as the unit 15 approaches coupling conditions. As the speed of the turbine 24 increases, the torque conversion of the unit 15 gradually decreases as will be illustrated subsequently by reference to graphs, and the changes of direction of the fluid discharging from the various vanes between the directions indicated by the vectors 101 to 111 are gradual and occurs in an infinitely variable manner.

The output torque (on the turbine 24 and shaft 12) is always equal to the input torque (on the shaft 10) plus the reaction torque (on the floater member 25 taken by the brakes 22 and 17 plus the torque on the stator 26 taken by the brake 21). As will be observed from FIG. 5 taken in connection with the above discussion, the floater blades 35 and 36 and the stator blades 39 under stall conditions have fluid impinging on them with a large backward component along the vector 101, tending to strongly urge them in the backward direction 101. Therefore, at this time, the reaction torque is at a maximum, and the torque conversion (the torque on the turbine 24 for any given input torque on the drive shaft 10) is at a maximum. Due to the changes in angles of the fluid discharged by the turbine blades 31 and 33 and by the second floater blades 36; the fluid, as the speed of the turbine 24 increases, does not impinge with such a large force in the direction 101 as before, and therefore, the reaction on the floater member 25 and on the stator 26 decreases and the torque conversion correspondingly decreases. This change in torque conversion is very gradual and infinitely variable. Eventually the force from the fluid discharged by the first and second turbine blades 35 and 36 is in the forward direction 100 sufficiently so that at some point such as .64 speed ratio $$\frac{\text{speed of shaft 12}}{\text{speed of shaft 10}}$$

the floater member 25 begins to rotate in the forward direction. Subsequently, the force of the fluid from the second floater blades 36 is also in a forward direction sufficiently with respect to the angles of the stator blades 39 so that the stator also begins rotation in the forward direction, and the converter 15 has at this time reached its so called "clutch point." Thereafter the converter 15 functions as a fluid coupling, and the torque at this time on the intermediate shaft 12 is substantially the same as the input torque on the drive shaft 10.

To illustrate the above-mentioned floater action, at a certain speed of the shaft 12 (which will vary according to the input torque on the drive shaft 10) the fluid will discharge from the blades 28, 31, 35, 33 and 36 as shown by the vectors 114, 115, 116, 117, and 118. At this time, the force from the fluid on the floater member will have gradually changed from a slight amount in the reverse direction 101 to a slight amount in the forward direction 100, and the floater will start to release from the one way brake 22 and will begin rotation in the forward direction 100 and 62.

The force from the fluid on the floater member 25 is the sum of the forces on the two sets of floater blades 35 and 36, inasmuch as these two sets of blades are connected together. The fluid forces on the floater blades 35 and 36 are due not only to the angle of discharge from the first turbine blades 31 on to the blades 35 and from the second turbine blades 33 on to the blades 36 but are also due to the difference between the inlet and outlet angles e and f on the first floater blades 35 and the difference between the inlet and outlet angles i and j on the second floater blades and the consequent redirection of the fluid by the floater blades in the positive direction 100. In connection with the magnitude of torque on the floater member 25 in either the forward or backward direction, it must be borne in mind that the floater blades 35 are at a greater radius with respect to the center of the shaft 12 as compared to the floater blades 36. Therefore, the same fluid force on the outer set of floater blades 35 will produce a greater torque on the floater member 25 than will the same fluid force impressed on the inner floater blades 36.

The outlet angles of the floater blades 35 and 36 also materially affect the torque on the floater member 25— the more the floater blades 35 and 36 extend in the forward direction 100—in general the greater will be the torque on the floater blades in the reverse direction 101 when the floater member 25 is stationary. The same considerations apply with respect to the turbine blades 31 and 33—the farther the blades 31 and 33 are from the axis of the shaft 12, the more the blades 31 and 33 are curved and the more the exit edges 83 and 87 extend in the backward direction 101, the greater is the torque on the turbine 24. Contrastingly, the outlet angles $d$, $f$, $h$, and $j$ are important in determining the torque on the turbine 24 and floater 25; on the other hand, the inlet angles $c$, $e$, $g$, and $i$ do not have much bearing on the torque on these members but do have a substantial bearing on the shock losses of the fluid impinging on the blades 31, 35, 33, and 36 and should be preferably in the ranges noted for holding the shock losses to a minimum.

Figure 9:
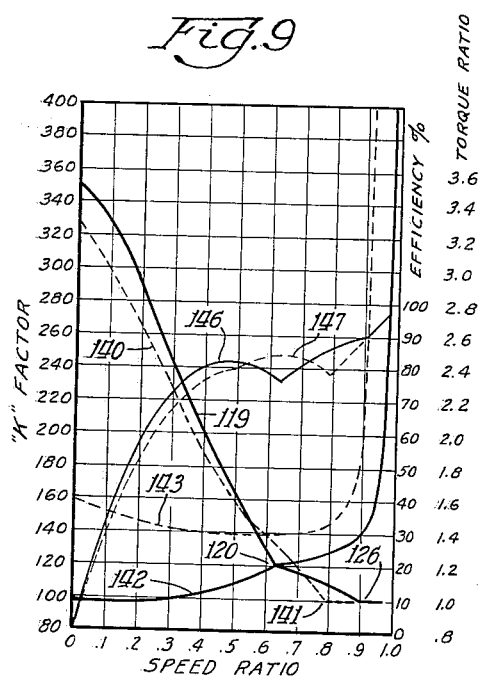
FIG. 9 is a graph showing the $k$ factor and the torque ratio for the converter.

Referring to FIG. 9 the curve 119 illustrates the manner in which the torque ratio of the converter decreases until a point 120 is reached at which the floater member releases off its one way brake 22 and begins its forward rotation. It will be observed that the torque ratio decreases quite steeply with increases in speed ratio (the speed of the shaft 12 divided by the speed of the drive shaft 10) until the point 120 is reached (at about 1.2 torque ratio), and subsequently the torque ratio curve 119 decreases much less steeply. During the portion of the curve 119 beyond the point 120 at about .63 speed ratio, until a 1.0 torque ratio is reached, the floater member 25 is rotating forwardly at some less speed than the turbine 24.

Eventually, the turbine 24 reaches a speed at which the stator 26 releases from its one way brake 21 and begins free forward rotation. This is the so called "clutch point" of the converter. At this time the fluid discharging from the various blades 28, 31, 35, 33, and 36 discharges more forwardly than before, the angles of discharge for these various blades being indicated respectively by the vectors 121, 122, 123, 124, and 125 as shown in FIG. 5. It is a principle of operation of torque converters that when the blade stage immediately preceding a stator is rotating at such a velocity that the outlet angle of the fluid of the member immediately preceding the stator is equal to the outlet angle of the stator, the torque converter has reached its clutch point beyond which the stator free wheels and causes no further torque multiplication. The fluid discharging from the second floater blades 36 at this time is in the direction indicated by the vector 125 which is approximately equal to the exit angle $l$ of the stator and therefore at this time the stator 26 reaches its free wheeling condition having substantially no forces on it in either the forward or reverse direction. Therefore, at the speeds of the turbine 24 above this point, the stator blades 39 have fluid forces in the forward direction on them, and the stator releases from its one way brake 21. The clutch point of the stator 26 is indicated on the graph of FIG. 9 as the point 126 which is at 1.0 torque ratio and which occurs at about .9 speed ratio for the particular converter under consideration.

The function of the floater member 25 in extending the clutch point 126 from a point at a lower speed ratio, which would occur were it not for the fact that the torque ratio curve flattens out beyond the point 120, will now be described with reference to the flow of fluid from the various blades of the converter 15. The turbine 24 is assumed to be rotating at some speed represented by the vector 127 in FIG. 6, which is such a speed that the floating member 25 floats in a forward direction at some speed less than turbine speed, the speed of the floater member 25 being represented by the vector 128. Under these conditions the direction of fluid leaving the first turbine blades 31 is in a direction indicated by the vector 129 which is about equal to the outlet angle $f$ of the first floater blades 35. Therefore if the floater blades 35 are considered apart from the blades 36, the floater member 25 would be in an equilibrium stage, just barely lifting off its one way brake 22 to rotate in the forward direction 100. However, at this equilibrium stage of the first floater blades 35, the fluid leaves the second turbine blades 33 in the direction indicated by the vector 130 such that the fluid impinges on the back sides of the second floater blades 36 driving the floater member 25 in the forward direction 100. Therefore, the floating member 25 rotates in the forward direction 100, the second floater blades 36 carrying the first floater blades 35. Under these conditions, the fluid leaving the second turbine blades 33 as indicated by the vector 130 impinges on the back sides of the second floater blades 36 in such a manner that the blades 36 redirect the fluid leaving the blades 36 to a more rearward direction indicated by the vector 131. The resistance to this change of fluid direction is provided by the first floater blades 35 which tend to be at equilibrium with zero velocity, and in redirecting the fluid leaving the second turbine blades 33 from direction 130 to direction 131, the second floater blades 36 absorb an amount of energy required to change the fluid direction from 130 to 131. It will be noted that the fluid discharging from second floater blades 36 in the direction 131 impinges on the forward concave side of the stator blades 39 whereby the stator blades redirect the fluid so that it leaves the stator blades in a more forward direction than it enters the stator blades, and therefore the stator 26 remains stationary and still functions to cause torque multiplication in the converter 15.

Under these conditions, the first floater blades 35 in being thus driven by the second floater blades 36 change the direction of the fluid from the direction 129 as it leaves the first turbine blades 31 to the direction shown by the vector 132 as it leaves the blades 35. In making this change of direction, energy is transferred to the second turbine blades 33 equal to the vector 133 which is the component in the forward direction of the difference between the vectors 132 and 129. Since the turbine 24 is connected to the output shaft 12 of the unit 15, this torque increase is transmitted by the shaft 12 so that the torque ratio of the converter does not continue to decline at the steep angle of the curve 119 prior to the point 120 but rather levels out as shown by the curve between the points 120 and 126 and extends the clutch point 126 to about .91 speed ratio rather than at about .7 speed ratio to which the initial portion of the curve 119 (prior to point 120) would project.

It will be noticed that the first floater blading 35 is such that it tends to rotate forwardly at a slower velocity than does the second floating member blading 36, for any given speed of the turbine 24. Therefore the second floating member blading 36 tends to change the fluid passing through the second blading 36 from some direction such as that of angle $m$ (the angle of the vector 130) for the second turbine blades 33 to the angle $n$ which is directed more in a backward direction. In other words, for any given toroidal fluid flow in the converter 15, the second floater blading 36 tends to redirect the fluid in a backward or negative direction. The energy dissipated for this redirection of fluid functions for all conditions in which the floater member 25 is floating forwardly (for speed ratios higher than .64 as well as higher than the clutch point 126 shown on FIG. 9) to return the momentum of the fluid indicated by the vector 133 back to the second turbine blading 33 for application to the shaft 12. Inasmuch as the direction of fluid flow by the second floater blades 36 has been changed from the angle $m$ to the angle $n$, the clutch point 126 of the converter has been delayed and does not take place until some higher speed ratio occurs than would otherwise be the case without the floater member 25. This is due to the angles of the floating member blades 35 and 36 and the angles of the turbine blades 31 and 33, such that the floating member 25 for any given speed of the turbine will, above the point 120, rotate at some speed slower than the speed of the turbine. Eventually some turbine speed is reached whereby the fluid leaving the second floating member blades 36 is equal to the outlet angle $l$ of the stator 26, and at this time the clutch point 126 is reached, and no further torque conversion takes place. After the clutch point has been reached and the stator 26 begins to free wheel on the one way brake 21, the stator can thereafter no longer substantially change or influence the direction of flow of the fluid passing through the stator blades 39.

When the converter is operating above point 126 (above .91 speed ratio), the floating member increases the torque capacity and tightens the coupling range essentially in the following manner: For any given impeller speed, the momentum of the fluid leaving the impeller can be represented by the vector 134. The second floater blades 36 always tend to change the direction of the fluid leaving these blades toward the negative direction, and likewise the fluid entering the impeller from the entrance edges 80 correspondingly changes from the direction indicated by the vector 135, if the second floater blades 36 were not present, to the direction indicated by the vector 136 with the floater blades 36 in the circuit. This change in the direction of the fluid entering the impeller incidentally occurs whether the stator 26 is stationary or free-wheeling; however, it occurs only as long as the floating member 25 is in a full float, that is, above .64 speed ratio in the particular converter illustrated in FIG. 4. The momentum of the fluid discharging from the impeller blades 28 is indicated by the horizontal component 137 of the vector 134, and the horizontal components 138 and 139 correspond to the forces in the direction of rotation due to the inlet fluid to the impeller 23 from the fluid flowing respectively in the directions 135 and 136. It will be observed that the torque on the impeller represented by the vector 137 minus the vector 139 is greater than the vector 137 minus the vector 138, and therefore it may be concluded that the torque on the impeller is greater with the floating member in place and in operation than it would be with the floating member 25 not included in the fluid circuit. This is due to the fact, briefly, that when the floating member is in the circuit, the horizontal component of the fluid entering the impeller is the smaller quantity 139 while the larger quantity 138 would constitute the horizontal component without the floating member 25. It must be borne in mind that the torque on any member in the converter 15 is always equal to the angular momentum of the fluid leaving the stage in question minus the angular momentum of the fluid entering the stage.

FIG. 9 shows also a torque ratio curve 140 for an ordinary three element torque converter having nearly the same torque ratio at stall as the illustrated floating member converter. As will be observed, the curve 140 reaches a 1.0 speed ratio at a point 141 which is at about .78 speed ratio instead of the .91 speed ratio clutch point of the converter of the invention. It is apparent from the graph that the converter of the invention thus has a substantially extended clutch point.

In addition to the torque ratio of the hydraulic torque converter, another important factor of the torque converter is the so-called $k$ factor. The $k$ factor may be defined as the input speed divided by the square root of the input torque. The change of $k$ factor for the converter 15 is also illustrated in FIG. 9 by the curve 142. As will be observed from FIG. 9, it will be noted that the $k$ curve rises slowly on increase of speed ratio until the point 120 is reached at which the floater member 25 begins its forward rotation. Beyond this point, there is a definite flattening of the $k$ curve (during which particular range of speed ratios the clutch point has been extended as previously described) until finally at about .9 speed ratio, the $k$ curve rises abruptly. The corresponding $k$ curve for the three element torque converter previously referred to is shown by the curve 143. As will be observed, the curve 143 droops, that is, it falls from about zero to .5 speed ratio and then subsequently at about .7 speed ratio it again rises but does not reach the .96 speed ratio that is reached by the $k$ curve of the floating member converter. The difference between a speed ratio of 1 to 1 and the maximum speed ratio reached by the respective $k$ curves indicates the degree of slip of the two converters. Due to the two rates of rise of the $k$ factor with the floating member converter, it in effect has a hump at about the point 120 and does not have a droop as does the ordinary three element converter.

Figure 10:
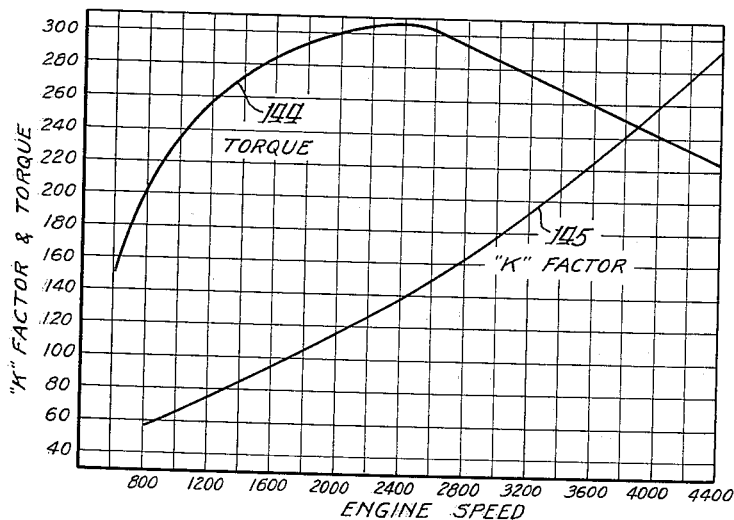
FIG. 10 is a graph showing the torque curve and the $k$ factor of an automibile engine that may be used with the transmission.

For best performance, the $k$ factor curve is approximately matched to the output torque curve of the vehicle engine with which the transmission is intended to be used. FIG. 10 shows such an engine torque curve 144 in relation to engine speed. It will be observed, that, with the particular engine to which the curve 144 pertains, the output torque rises quite abruptly from 800 r.p.m. engine speed to a maximum at approximately 2400 r.p.m., and subsequently the output torque decreases until a maximum engine speed of 4400 r.p.m. is reached. FIG. 10 also shows the $k$ factor curve 145 for the vehicle engine. Referring to this curve, it will be observed that at 2400 r.p.m., the $k$ factor would be about 136. Referring to FIG. 9, it will be observed that at the hump of the $k$ curve 142 for the converter 15 (at point 120) the approximate value of the $k$ factor is 120. Referring to FIG. 10 and curve 145, this would correspond to a speed of 2100 r.p.m. of the associated engine, and referring to curve 144, this engine speed corresponds to an output engine torque of 303 foot pounds, which is very close to the peak torque of the engine of 306 foot pounds. The point 120 of the $k$ curve has thus been matched against substantially the maximum value of the output engine torque.

This matching of the $k$ factor at the point 120 with nearly the maximum engine torque output and the particular shape of the $k$ curve for the floating member converter between zero speed ratio and .64 speed ratio, wherein the $k$ curve rises slowly at first and subsequently rises at a greater rate, permits the engine to start driving the vehicle in nearly its peak torque range (about 1680 r.p.m.) and quite rapidly rise to 2100 r.p.m. closer to peak torque. At this time, due to the flattened initial portion of the $k$ factor curve 142, the engine is forced to linger at substanitally its peak torque output for quite an extended range of vehicle speed, thereby delivering peak torque to the transmission and converter for a wide range of engine speeds. The particular shape of the $k$ factor curve 142 arrived at is due to substantially the same reasons which cause the extension of the clutch point, namely, the relation of the angles between the first and second floating member blades 35 and 36 and the first and second turbine blades 31 and 33, whereby past the point 120, the second floating member blades 36 rotate forwardly at some speed slower than the fluid leaving the second turbine blades 33 would have them rotate. In other words, if the second floating member blades 36 were not in the circuit, the fluid entering the impeller or entering the stator, depending on whether the converter is operating past or before the clutch point 126, would be received in a more forward direction, so that the second floating member blades 36, past the point 120, are always redirecting the fluid in a more rearward direction. This rearward direction is the direction which tends to keep the stator 26 seated or stationary for a longer period of time in terms of converter speed ratio, and which results in the torque on the impeller after the clutch point, past point 126 towards 1.0 speed ratio, being more negatively directed than would otherwise be the case, thereby causing the impeller to handle more torque for a given engine speed. This implies also that the slip has been reduced and the coupling range efficiency has been increased.

Another pertinent factor regarding the floating member converter, as well as other converters, is the span of the converter, which is merely the $k$ factor at the clutch point of the converter minus the $k$ factor at stall. In the case of the three element converter shown by the curve 143 in FIG. 9; the $k$ factor at the clutch point, which is .79 speed ratio, has the value of 146, and the $k$ factor at stall for the same converter is 159. Subtracting 159 from 146 is a minus 13 which is the span. This negative span is typical of a high ratio three element torque converter. Contrasted to this negative span is the positive span of the floating member converter. The $k$ factor at the clutch point is about 142, and the $k$ factor at stall is about 97 so that the span is a positive 45. A negative span for a converter results in an unduly high stall speed and a poor coupling of the converter to the engine, while the slowly rising $k$ curve 142 which flattens after the point 120 has been reached, results in a lower stall speed and a tapping of the engine torque curve in the region of its maximum value for a longer period of time while the vehicle is being accelerated.

The efficiency of the floating member converter of the invention is illustrated by the curve 146 in FIG. 9 and is compared to the efficiency for the ordinary three element converter previously referred to and which is illustrated by the curve 147. As will be observed, the efficiency for the floating member converter is decidedly higher at the higher speed ratios, rising to approximately 97 percent at the maximum but is lower in the vicinity of .64 speed ratio at which the floater member 25 begins its forward rotation. Inasmuch as most of the driving of the vehicle is done at the higher speed ratios, a large saving in engine fuel is obtained.

The impeller blade 148 is approximately the blade that is used in the conventional three element torque converter and the characteristics of which are illustrated in FIG. 9 (143, 140 and 147)—the floater member 25 of course being omitted in this prior converter. This is a backwardly bent blade, and the backward lean has been used in order that a comparatively high stall torque ratio is obtained; however, as is apparent from FIG. 9, at the expense of obtaining this relatively high torque ratio, the backward lean on the impeller blades 148 results in a drooping $k$ curve 143, a high stall speed a relatively poor coupling range—the clutch point occurs below .8 speed ratio instead of above .9 speed ratio as with the floating member converter—and in addition the slip is relatively high with the three element converter and the efficiencies are low. The illustrated floating member converter, although it has substantially radial impeller blades 28, nevertheless has less slip, greater efficiency, a low stall speed a rising $k$ curve and an extended clutch point, due to the action of the floating member 25.

As has been previously described, drive range is obtained by allowing the brake 17 to remain engaged and engaging the clutch 20 in lieu of the brake 18. The clutch 20 connects the sun gear 42 with the one way brake 22 so that, initially, as the driven shaft 11 begins rotation, the brakes 17 and 22 take the reaction from the sun gear 42 as well as from the floater member 25. The overall torque multiplication provided by the transmission between the drive and driven shafts 10 and 11 is the same at this time as in performance range, in view of the fact that in this case again both the torque converter 15 and the gearing 16 are converting torque. In the particular transmission with the characteristics of which are illustrated graphically in FIG. 9, a 1.46 gear ratio was chosen for the gearing 16 because it was found possible with this gear set to deliver approximately the same torque ratio to the driven shaft 11 using the converter 15 and the single gear set 16 as is usually possible with a conventional converter having a two to one torque conversion ratio and with gearing providing low, intermediate, and high speed ratios instead of only the two ratios (intermediate speed and lock-up condition) provided by the gearing 16.

As has been described previously, as the speed of the turbine 24 increases, eventually the fluid in the converter 15 tends to rotate the floater member 25 in the forward direction. In drive range, the floater 25 is connected directly through the clutch 20 with the sun gear 42 which has reverse torque on it due to the reaction of the gear set 16, and the reverse reaction torque from the sun gear 42 initially is greater than the positive torque on the floater member 25 due to the fluid in the converter 15, and the floater member 25 does not begin forward rotation at the same low speed of the turbine 24 as in performance range. Eventually, the positive torque on the floater member 25 due to the fluid in the converter 15 becomes greater than the reaction torque on the sun gear 31 and causes both the floater member 25 and the sun gear 42, connected directly together by the clutch 20, to begin rotation in the forward direction, releasing from the one-way engaging brake 22. As the speed of the turbine 24 increases still further, the speed of the floater member 25 increases at a greater rate than the turbine and eventually the floater 25 reaches nearly the same speed as the turbine 24. Since the floater member 25 is connected to the sun gear 42 and the turbine 24 is connected to the carrier 46, at this time the gear set 16 is substantially locked up in a one to one ratio such that its elements rotate nearly at the same speed.

In order for this substantial lock up condition of the gear set to take place, the torque split between the floater member 25 and the turbine 24 must be the same as the relationship of the torque on the carrier 46 and on the sun gear 42 when the gear set 19 is substantially locked up. For the particular gear set previously mentioned under locked up condition, the ratio between the torque on the carrier 46 and on the sun gear 42 is 68.5 percent to 31.5 percent; and the floater member 25, at high speeds of the turbine 24, must thus have sufficient capacity to transmit 31.5 percent of the torque as compared to 68.5 percent for turbine 24. The blade angles 35 and 36 of the floater 25 are preferably designed so that they will be most efficient when they are retarded from complete free rotation by the 31.5 percent torque just mentioned. The blades 31, 35, 33 and 36 are such that the 31.5 percent–68.5 percent torque split occurs at some predetermined high speed ratio, such as .98 speed ratio.

Figure 7:
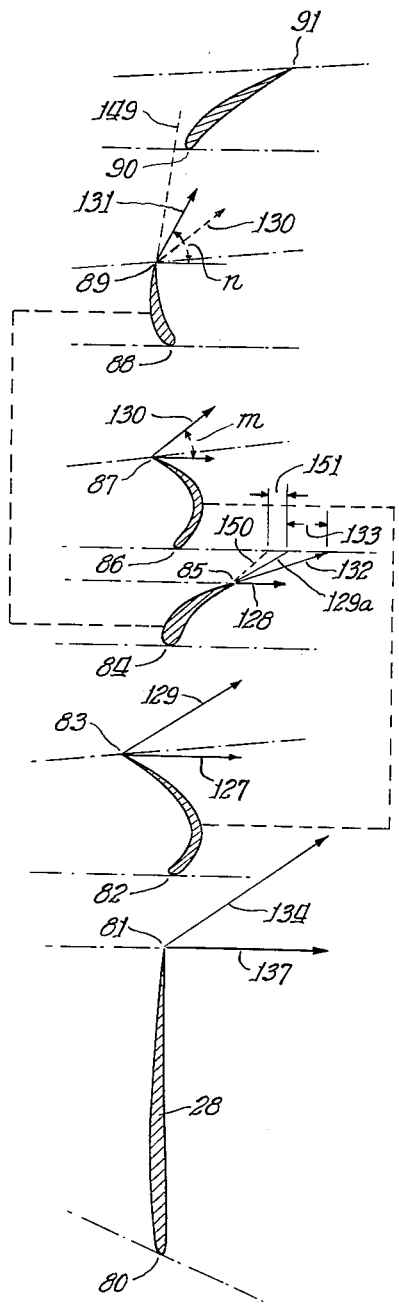
FIG. 7 is a view similar to FIG. 6 but showing fluid vectors obtained during a drive range.

In drive range, up to a predetermined road speed, the floating member 25 has much the same functions as in performance range. Until the floater member 25 begins to drive the sun gear 42, the converter 15 and gearing 16 perform in exactly the same manner as in performance range; and, subsequently, after the floater member 25 begins to drive, the floater member 25 under these conditions rotates at a slower speed than it would otherwise; since it now has, in addition to the hydraulic forces on it, also the negative torque from the sun gear 42 on it. The results of this slower rotation of the floating member 25 is that the fluid passing through its blades 35 and 36 is directed rearwardly to a greater extent than was the case when the floating member 25 was free to rotate exclusive of negative torque on it from the sun gear 42. Referring to FIG. 7, the direction of the fluid discharging from the floater blades 36 is now in a direction indicated by the vector 149, and the direction of the fluid discharging from the floater blades 35 is indicated by the vector 150. The difference in the energy content in the direction of blade rotation 100 between the vector 150 and the vector 129a, which is simply the vector 129 moved from the blade end 83 to the blade end 85, is indicated by the quantity 151 which corresponds to the energy that is transmitted by the floater 25 to the sun gear 42. The vector 151 and thus the energy transmitted to the sun gear gradually increases with increasing turbine speed until the torque split arrives at the 31.5 percent–68.5 percent previously mentioned.

As was discussed in connection with performance range, the more rearward is the direction of the fluid discharged from the second floater blades 36, the greater is the torque capacity of the impeller 23. The same principle applies in drive range. Since the slower rotation of the floater member 25 has changed the direction of the fluid leaving the second floater blades 36 to that indicated by the vector 149, the impeller can thus handle or transmit a larger torque than would otherwise be possible which produces a tighter and more efficient coupling range, that is, the clutch point is at a higher speed ratio and the efficiency is higher at the higher speed ratios. As was mentioned in connection with performance range, the torque on any member in the converter, and particularly on the impeller in this case, is proportional to the angular momentum leaving the impeller minus the angular momentum entering, and the angular momentum entering has been reduced by the movement of the fluid rearwardly from the discharge end of the second floater blades 26 to the direction 149.

Figure 11:
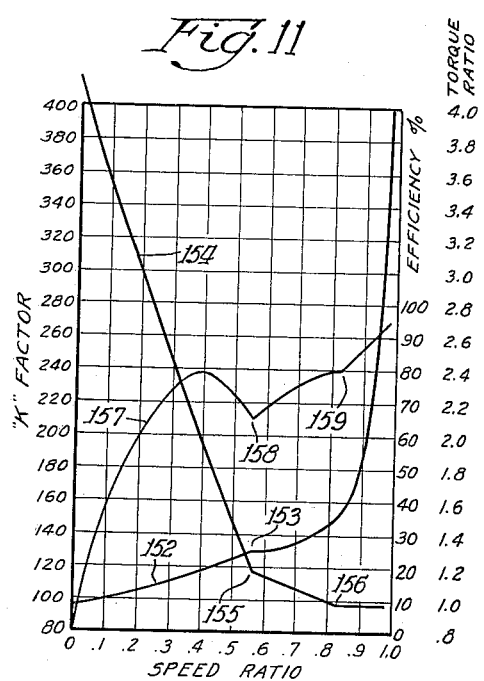
FIG. 11 is a graph showing the $k$ factor and the torque ratio curves of the transmission in a drive range.

Referring to FIG. 11, it is apparent that the floating member 25 has substantially the same effect on the $k$ factor as in performance range. The $k$ factor curve in this figure is designated by the numeral 152, and it will be noted that the $k$ factor begins at the same value for zero speed ratio as in performance range, but the $k$ factor for drive range rises at a slightly increased rate to a value of 130 at .57 speed ratio. This increased rate is due to the influence of the gear set 16. To compare the corresponding rise of the $k$ factor in performance range, it will be noted that the $k$ factor starts at 97 in performance range, but by the time the turbine has reached .57 speed ratio, the $k$ factor has only risen to a numerical value of 114. It will be observed from FIG. 11 that after .57 speed ratio, the $k$ factor curve for drive range flattens out before subsequently rising quite rapidly to a maximum at .98 speed ratio.

At the $k$ factor value of 130 at .57 speed ratio indicated by the point 153 in FIG. 10, the engine speed is at 2300 r.p.m. which is at the peak torque of the engine, referring to FIG. 10. This $k$ factor characteristic of peaking at point 153 and then leveling out enables the tapping of the engine at its peak torque level, so that as the vehicle picks up in speed, the engine speed lingers in the vicinity of 2300 r.p.m., and the engine keeps delivering torque at a high value, rather than at lower values on either side of the peak point, and thus a greater acceleration of the vehicle is obtained. Thus through the judicious use of gearing 16 of the proper speed ratio, the gearing and torque converter have been combined to increase the rate of rise of the $k$ factor from a certain stall speed to the engine speeds at peak torque of the engine, and at this point (153) the $k$ curve flattens so that the engine is held at this peak torque level for a much longer period of time than would otherwise be possible.

Referring to FIG. 11, it will be observed that the torque ratio for drive range, indicated by the curve 154, starts at about 4.1 at stall and decreases to the point 155 occurring at about .56 speed ratio. The torque ratio subsequently decreases at a much slower rate until the point 156 is reached, and the torque ratio thereafter remains at unity.

The efficiency in drive range also is shown on FIG. 11 by curve 157. It will be noted that it rises to a rather high value at .4 speed ratio, and it dips to a relatively low value of 65 percent at the point 158 occurring at .55 speed ratio. Thereafter the efficiency rises to the relatively high value of 96 percent after dipping slightly at point 159. The .54 speed ratio in connection with points 155 and 158 is that speed ratio at which the floating member 25 has had sufficient torque applied to it from the fluid in the converter that it just begins to drive the sun gear 42 and release the brake 22. As the speed of the turbine 24 increases so that the speed of the driven shaft 11 approaches that of the drive shaft 10, the torque ratio fades and decreases from the point 155 at a reduced rate; until at the point 156, the stator 26 releases off the one-way brake 21 due to the fluid impinging on the rear faces of the stator blades 39. Thereafter the torque ratio remains at unity.

The connection with the split of torque that occurs between the turbine 24 and the floating member 25, the split of 31.5 percent and 68.5 percent above mentioned is obtained not only through the use of proper outlet angles for the blades of these members but also due to the fact that the turbine blades 31 are positioned near the outermost part of the fluid circuit, measured from the center line of the shaft 12, and the floater blades 35 are positioned next to the turbine blades. In addition, the turbine blades 33 are positioned farther outwardly from the shaft 12 than are the floater blades 36. As has been previously mentioned, the farther outwardly in the fluid circuit measured from the center of the shaft 12 that the blades are positioned, the greater is the torque on the blades; and hence the turbine blades 31 and 33 are positioned outwardly with respect to the floater blades 35 and 36, respectively, inasmuch as it is desired that the turbine 24 provide more torque in the locked up condition of the gear set 16 than the floater member 25.

Referring in particular to FIG. 9 and particularly to the $k$ curves 142 and 143, it will be noted that the stall speed (at zero speed ratio) of the floating member converter of the invention is materially less than that for the comparable three element converter. As will be recalled, the stall speeds are proportional to the $k$ factors; and for the two converters under consideration, the stall speed of the three element converter is 64 percent higher than that of the floating member converter. In other words, the same engine attached to the floating member converter will stall at 1750 r.p.m., for example, while with the three element converter it would spin to 2872 r.p.m. This is assuming that the two converters are of the same size and assuming that other conditions are the same. This is advantageous in view of the fact that a relatively low stall speed is desirable in connection with passenger car engines due to the undesirable high noise level, high fuel consumption and high wear and tear of moving parts.

It is desirable in connection with the converter 15 with the gear set 16, both in performance range when the sun gear 42 is held stationary or in drive range when the floating member 25 may drive the sun gear, that the $k$ factor slowly rise from zero speed ratio until an intermediate speed ratio and then level out for additional rises of speed ratio until a final abrupt increase takes place in the vicinity of .9 to 1.0 speed ratio, in order that the high torque condition of an ordinary vehicle engine, which as shown in FIG. 10 is greatest at an intermediate engine speed, may exist for a longer period of time when the vehicle is accelerated. This change of $k$ factor with respect to speed ratio has been obtained in both the performance range and also in the drive range of the transmission as will be noted from the curves 142 and 152. A negative span or drooping $k$ factor, such as is illustrated by the curve 143 for the prior art high ratio converter in FIG. 9 and which leads to opposite results, has been eliminated. According to FIG. 9, the span of the prior art three element converter is a minus 13 while the floating member converter shows a plus 44 span.

The floating member 25 in the illustrated converter, as has been mentioned, also has the effect of extending the clutch point. Referring to FIG. 9, the clutch point 126, it will be noted, is considerably higher than the clutch point 141 for the conventional three element converter. Therefore, torque conversion is available over a greater range with the floating member converter than with the conventional three element converter. The effect of this extension of the clutch point with respect to the torque applied on the driven shaft 11 becomes quite considerable particularly when coupled with the fact that the three element converter depresses the engine speed at the clutch point 141 (with respect to the stall speed) while the floating member converter 15 elevates the speed considerably at the clutch point 126, in view of the fact that the $k$ curve 142 has risen considerably from its value at zero speed ratio with respect to its value at the clutch point.

The clutch point 156 in the drive range, although not being at the high value of speed ratio as in the performance range, nevertheless is at a high value in terms of road speed.

With respect to efficiencies, it will be observed from FIG. 9 that the floating member converter provides substantially higher efficiencies than does the conventional three element converter, referring to curves 146 and 147.

Figure 18:
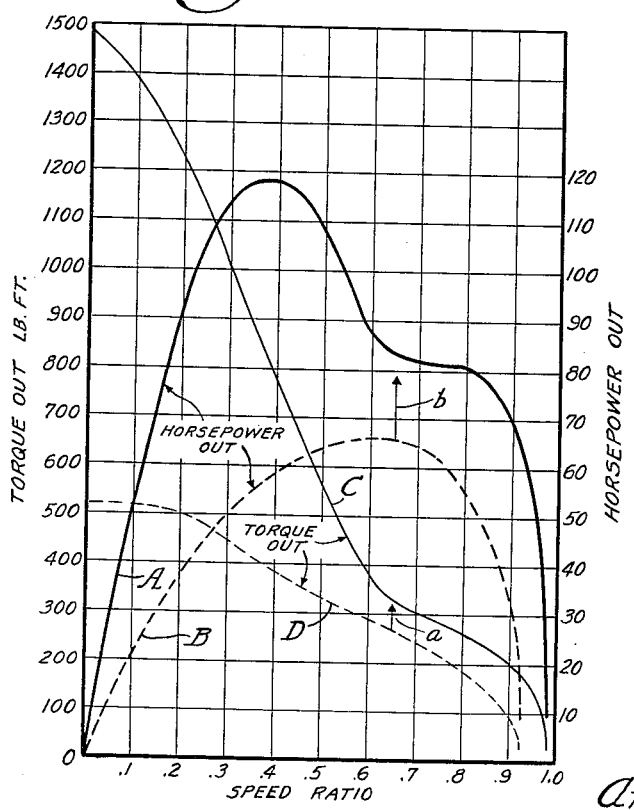
FIG. 18 is a graph showing the relation between the output torque and output horsepower for any given speed of the hydraulic torque converter of the invention and also a prior art high ratio torque converter.

FIG. 18 shows the relationship between the output horsepower and output torque of the hydraulic converter 15 with relation to speed ratio $$\frac{\text{speed of impeller 27}}{\text{speed of turbine 24}}$$

and also shows the corresponding values for a prior art high torque ratio three element converter. The output horsepower of the converter 15 is shown by the curve A, and the output horsepower by the prior art converter is shown by curve B. The output torque of the converter 15 is shown by the curve C, and the output torque of the prior art converter is shown by the curve D. The two converters are of the same diameter and have their impellers driven at the same speed. It will be observed from FIG. 18 that the curve A showing the output horsepower from the converter 15 is greater over the entire range of speed ratios than is the horsepower curve B for the prior art converter. Also, it will be observed that the output torque for the converter 15 illustrated by the curve C is greater over the entire range than is the output torque for the prior art converter illustrated by the curve D. Referring to FIG. 9 it will be observed that at .65 speed ratio, the efficiency of the prior art converter illustrated by the curve 147 is greater than the efficiency of the converter 15 illustrated by the curve 146; however, referring back to FIG. 18, regardless of this fact, it will be observed that even if the competitive converter is allowed 100 percent efficiency at .65 speed ratio (illustrated by point $b$), the converter 15 will still deliver more horsepower in this range than the competitive unit. Likewise, with respect to the output torque, if the competitive converter is allowed 100 percent efficiency at .65 speed ratio (as illustrated by point $d$ in FIG. 18), nevertheless, the converter 15 still delivers more output torque than the conventional converter. The slip with the floating member converter is also substantially less under road load, as will be observed from the speed ratios at the highest values of the $k$ factors.

Although the stall torque ratios of the conventional and floating member converters seem to be about the same from FIG. 9, nevertheless due to the very different values of the $k$ factor at stall, the engine speed for the conventional three element converter is at higher values causing more noise fuel consumption, wear and tear than for the floating element converter. In view of the fact that the floating member converter is able to tap the engine at a high torque value for a longer period of time as the speed ratio increases, the same vehicle equipped with the floating member converter 15 instead of a conventional three element converter would be able to accelerate from a standing start to any particular speed in a shorter length of time.

The floating member converter 15 provides a relatively high torque ratio while yet providing an extended coupling range and high efficiencies at high speed ratios particularly since the turbine 24 has the split blading 31 and 33 so as to provide in effect two turbines; and since the floater member 25, which is split and which is held stationary initially by the brake 22, thus provides two stators in addition to the main stator 26. In view of the fact that the converter 15 provides such high efficiencies, it is not necessary that any parallel lock up clutch be used with the converter for ordinary driving of the vehicle.

It is noteworthy that a sudden deceleration of the vehicle engine as by a sudden release of the engine throttle does not provide a sudden negative acceleration of the driven shaft 11 which would be felt by the vehicle passengers as a decelerational lurch. This is due to the fact that any negative energy that passes from the driven shaft 11 through the gear set 16 simply causes the floater member 25 to release from the one way engaging device 22 and rotate in the forward direction. In addition, the transmission has the advantage of smoothly driving the driven shaft 11 when a change is made from the condition in which the floating member 25 is moving forwardly to the condition in which it anchors on the free wheeling unit 22. This is due to the fact that the floater member 25 changes from forward rotation toward negative rotation at a point of zero torque on the floater member 25 from the fluid within the converter 15, and therefore the torque on the free wheeling unit 22 when it engages is zero; and the torque gradually builds up on the unit 22 as the impeller 23 is increased in speed and as the engine throttle is opened.

It is noteworthy that the change from drive range to performance range is a very smooth, shockless change. If the change is made while the torque from the vehicle engine is high or when the speed of the vehicle is low, the floater member 25 and the sun gear 42 will be stationary and will be reacting against the one way brake 22, so that under these conditions no change can be observed, since the sun gear 42 in lieu of being held stationary by the one way brake 22 and friction brake 17 is simply held stationary by the friction brake 18.

If the change is made at higher speeds or less engine torque output, the change is still extremely smooth. It is contemplated that the clutch 20 is allowed to remain engaged momentarily subsequent to the initiation of this change in drive and that the friction band 56 unwraps for the direction of rotation of the drum 55 in the forward direction 62, wrapping for a force on the drum 55 in the reverse direction. By "wrapping" is meant the tendency of the brake band 56 to engage on the drum 55 with a greater force when the drum 55 tends to rotate in the reverse direction and with a less force when the drum 55 tends to rotate in the forward direction. Just prior to the change from drive to performance range, the floating member 25 under these conditions is rotating forwardly at some speed approaching that of the turbine 24, so that as the brake 18 is applied, the brake immediately begins to provide a reaction for the gear set 16 but the change of speed of the floating member 25 from the forward rotation approximating the speed of the turbine 24 to zero speed is absorbed in the fluid circuit of the torque converter tending to make the application of the brake 18, particularly since it is acting under these conditions in an unwrapping direction, very smooth and gradual. Once the brake 18 is fully applied and the floating member 25 has been brought to zero speed, the clutch 20 is then disengaged, and thereafter any negative torque on the floater 25 is taken by the one way brake 22, while if the engine torque is relatively low or the vehicle speed is relatively high, the floater member 25 may free-wheel on the brake 22. On disengagement of the clutch 20, the brake 18 takes only the reactive force on the sun gear 42, whether it be in the reverse direction for a drive from the drive shaft 10 to the driven shaft 11 or in the forward direction when the vehicle is coasting against the engine. Due to the fact that the floating member 25 is rotating in the forward direction when the change is made, it is not necessary to allow the vehicle engine to race or momentarily increase in speed as when such a downshift is made with ordinary transmissions in which it is necessary to engage a rotating member while practically simultaneously disengaging another rotating member in order to make the change, and no relatively difficult timing and transition problems are encountered in engaging and disengaging the two friction engaging mechanisms at just the right time.

A certain relationship preferably exists between the various dimensions of the converter parts, namely, the angles of the blades, the radii of the blades from the center of the shaft 12 and the areas of the blades, on the one hand, and the dimensions of the gears of the gear set 16 on the other hand, giving a certain gear ratio. These certain relations exist in order to infinitely variably fade in and fade out the torque multiplication of the mated gears of the gearing 16 at a predetermined speed ratio in drive range.

The converter is preferably designed to deliver a maximum efficiency at a high speed ratio of the transmission as a whole (converter plus gearing) such as .98 speed ratio. In a particular case, 79 teeth were provided in the ring gear 43, 21 teeth on the pinions 44 and 45, and 25 teeth on the sun gear. Under starting conditions, it will be noted that the carrier 45 is the input member, the sun gear 42 is the reaction member and the ring gear 43 is the output member of the gearing 16. Torque multiplication in the gearing in this case will be $$\frac{R}{R-S}$$

or $$\frac{79}{79-25}$$

for a torque multiplication of 1.463 for the specific gear teeth combination mentioned. R in this formula is the number of teeth in the ring gear 43 and S is the number of the teeth in the sun gear 42.

Simple geometry will reveal that, in order for this gear set to support an output torque of one, the carrier must carry 68½ percent of the torque while the sun gear carries 31½ percent. This selfsame ratio of hydraulic torque split has been designed into the turbines and floaters. In other words, the torque on the first turbine plus the torque on the second turbine over the torque of the first floater plus the torque of the second floater bares the relation of $$\frac{.685}{.315}$$

at the predetermined point of maximum efficiency. (In this case, .98 speed ratio.) It, therefore, may be stated that $$\frac{T_1+T_2}{T \text{ total}}=\frac{1}{R}$$

for compatibility between the torque converter and gearing.

$T_1$ is the torque on the first turbine blades 31; $T_2$ is the torque on the second turbine blades 33 and T total is the total output torque from the shaft 11.

The converter 15 is designed and particularly the relation between the turbines 31 and 33 and floaters 35 and 36 is determined using the following relations:

$$T_1+T_2=PQ\bigg[\omega i(K_{t2}R_{t1}^2-c_2R_p^2+K_{t2}R_{t2}^2-K_{f2}R_{f2}^2)$$
$$+Q\bigg(\frac{2R_{t1}}{2A_{t1}}\cot_2\alpha_{t1}-\frac{c_2R_p}{2A_p}\cot_2\alpha_p$$
$$+\frac{2R_{t2}}{2A_{t2}}\cot_2\alpha_{t2}-\frac{2R_{f1}}{2A_{f1}}\cot_2\alpha_{f1}\bigg)\bigg]$$

$$f_1+f_2=PQ\bigg[\omega i(K_{f2}R_{f1}^2-K_{t2}R_{t1}^2+K_{f2}R_{f2}^2-K_{t2}R_{t2}^2)$$
$$+Q\bigg(\frac{2R_{f1}}{2A_{f1}}\cot_2\alpha_{f1}-\frac{2R_{t1}}{2A_{t1}}\cot_2\alpha_{t1}$$
$$+\frac{2R_{f2}}{2A_{f2}}\cot_2\alpha_{f2}-\frac{2R_{t2}}{2A_{t2}}\cot_2\alpha_{t2}\bigg)\bigg]$$

$T_1$ plus $T_2$ is the combined turbine torque and $f_1$ plus $f_2$ is the combined floater output torque. T total for approximately constant speed drive range conditions then equals $(T_1+T_2)+(f_1+f_2)$.

Figure 17:
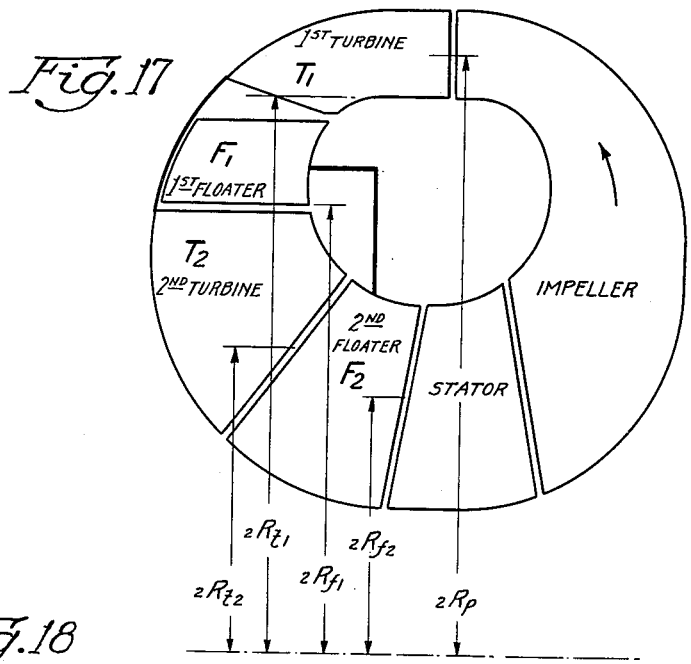
FIG. 17 is a schematic view of the hydraulic torque converter of the transmission showing the radii of the various bladed elements of the converter.

The various values in the above equations are as follows (referring to FIG. 17):

$P$=density of fluid in lbs./cu. ft.
$Q$=flow rate, in cu. ft./sec.
$\omega i$=angular velocity of the impeller, in rad./sec.
$K_t$=ratio of the velocity of the turbine to the velocity of the impeller.
$K_f$=ratio of the velocity of the floater to the velocity of the impeller.
$c$=correction factor (about .96, varying with smoothness of blade surfaces, etc.)
$2R_p$=outlet radius of impeller.

$2R_{t1}$ = outlet radius of first turbine.
$2R_{t2}$ = outlet radius of second turbine.
$2R_{f1}$ = outlet radius of first floater.
$2R_{f2}$ = outlet radius of second floater.
$2A_p$ = outlet area of impeller (total outlet fluid area of impeller).
$2A_{t1}$ = outlet area of first turbine.
$2A_{t2}$ = outlet area of second turbine.
$2A_{f1}$ = outlet area of first floater.
$2A_{f2}$ = outlet area of second floater.
$2\alpha_p$ = outlet angle of impeller.
$2\alpha_{t1}$ = outlet angle of first turbine.
$2\alpha_{t2}$ = outlet angle of second turbine.
$2\alpha_{f1}$ = outlet angle of first floater.
$2\alpha_{f2}$ = outlet angle of second floater.

For the preferred performance mentioned above, the ratio of $$\frac{T_1+T_2}{f_1+f_2}$$

approximately equal $$\frac{\frac{1}{R}}{1 \text{ minus } \frac{1}{R}}$$

where R is the ratio of the gear set with the sun gear 42 stationary. For the particular gear sizes mentioned above, R equals 1.463.

For an actual converter built according to the teachings of my invention, at an impeller speed of 2000 r.p.m., the flow rate Q would be 1.365 cubic feet per second. The turbine 24 would be at .98 speed ratio and the floater 25 would be at .98 speed ratio with respect to impeller speed, and the torque split between the first and second turbines and the first and second floaters assumes the value required by the gearing 16 in order to effectively carry an output torque of 1, assuming the input torque is 1. It may be noted that during the entire transition of speed ratios between the shafts 10 and 11, no bands, clutches or valves need shift, and control is not required from an external governor. During each condition of constant speed operation, the converter and transmission as a whole preferably fade into the condition of maximum efficiency.

The transmission provides three levels of grade retard, that is, conditions in which the rotation of the driven shaft 11 is retarded so that the vehicle is retarded from forward motion. The second condition of grade retard will now be described in view of the fact that it is related quite closely to performance range and in particular the initial phases of performance range just described in which the clutch 20 is preferably retained in engagement for a time in making the change from drive range to performance range. As will be noted from FIG. 3, the two brakes 17 and 18 are engaged in addition to the clutch 20 for this grade retard condition. The friction brake 18 and friction clutch 20 cooperate to prevent the floater member 25 from rotation in either direction, and the brake 18 holds the sun gear 42 from rotation. On some given grade for the vehicle, the ring gear 43 becomes an input member and drives the carrier 46 forwardly which in turn drives the turbine 24 in this direction. The turbine 24 generates a head so that the fluid rotates through the converter in a clockwise direction (opposite to the arrows A). In this case, the fluid leaving the second turbine blades 33 impinges on the first floating member blades 35 which are stationary, and the fluid impinging on both the floater blades 35 and 36 absorbs approximately 65 percent of the energy, and the other 35 percent is transmitted directly from the first turbine blades 31 into the impeller 23 and thereby into the vehicle engine. The usual engine friction is thus also utilized, in addition to the retarding effect of the floater member 25 for retarding rotation of the shaft 11 and movement of the vehicle. In view of the fact that the floater member 25 extracts such a high percentage of the energy from the shaft 11, this grade retard condition may be utilized even at relatively high vehicle speeds.

For reverse drive, the brake 19 and the clutch 20 are engaged. The brake 19 is effective for holding the carrier 46 stationary and is effective through the carrier 46 for holding the turbine 24 stationary. The reverse torque is obtained from the floating member which is driven reversely by the fluid in the converter 15, and the turbine blades 31 and 33 at this time function to redirect the fluid so that the floater member 25 is urged rearwardly. Inasmuch as the brake 17 is disengaged, the floating member 25 rotates backwardly, and its torque is transmitted through the shaft 13 and clutch 20 to the sun gear 42. Since there are the two sets of planet gears 44 and 45 between the sun gear 42 and the ring gear 43, the ring gear 43 is also driven in the reverse direction but at a reduced speed with respect to the sun gear 42.

Figure 8:
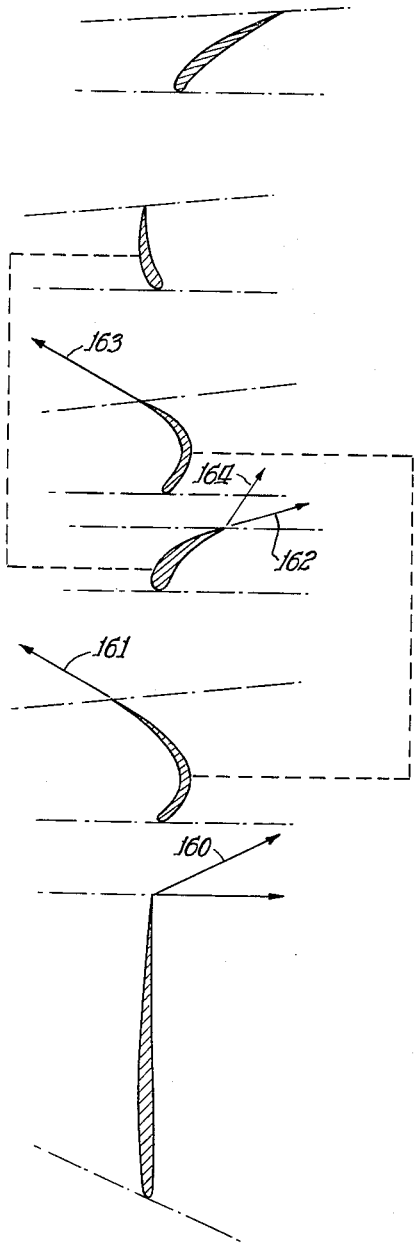
FIG. 8 is a view similar to FIG. 6 but showing fluid vectors obtained during reverse driving conditions.

Referring to FIG. 8, for reverse drive the vector 160 indicates the direction of fluid discharging from the impeller blades 28 and impinging on the turbine blades 31. The turbine 24 is stationary, and the blades 31 thus direct the fluid rearwardly as indicated by the vector 161. The fluid leaving the turbine blades 31 impinges on the first floater blades 35 and tends to drive the floater member 25 rearwardly, and the fluid leaves the floater blades 35 in the direction indicated by the vector 162. This fluid leaving the floater blades 35 impinges on the turbine blades 33; and these blades, being stationary, reverse the fluid so that it leaves the blades 33 in the reverse direction as indicated by the vector 163. This fluid impinges on the second floater blades 36 and also thereby tends to drive the floater member 25 in the reverse direction, so that the torque on the floater member 25 is the sum of the torque on both sets of floater blades 35 and 36.

As the vehicle increases in speed in reverse drive, the vector of the fluid leaving the first floater blades 35 gradually rotates counterclockwise as seen in FIG. 8, so that eventually it leaves the blades 35 in a direction as indicated by the vector 164. There is a smaller component of fluid force, therefore, on the turbine blades 33; and the force of the fluid on the blades 33 decreases and the turbine 24 thus takes a less reaction force from the fluid. In accordance with well-known principles of operation of hydraulic torque converters, if the reaction force on the reaction member decreases, the torque conversion likewise decreases; and therefore the torque on the floater member 25 approaches zero. The condition of changing fluid direction from the floater blades 35 continues until the speed of the floater member 25 in a rearward direction equals the velocity of the fluid leaving the turbine blades 31 and 33. The torque on the floater member 25 approaches zero when the speed of floater member 25 is approximately the same as the speed of the impeller 23 but in the opposite direction. During all times that the transmission is operating in reverse, the stator 26 remains stationary.

The transmission advantageously provides a rising $k$ factor in reverse so that as the speed of travel is increased in the reverse direction, the speed of the vehicle engine increases. The opposite would be true if the transmission provided a drooping $k$ curve which would mean that as the vehicle picks up in speed, the engine actually slows down, a condition rather disconcerting to the vehicle operator.

The first condition of grade retard as will be noted from the table of FIG. 3 and which is an extremely high level of grade retard for the vehicle, is obtained by engaging the same two friction devices as for reverse drive, namely, the clutch 20 and the brake 19. Under this grade retarding condition, the turbine 24 is stationary, and the floater member 25 now acts as an impeller, causing toroidal flow of fluid within the converter 15 in a clockwise direction, that is, opposite to the arrows A. The floater member 25 is driven through the gear set 16 from the driven shaft 11, the gear 42 and the floater member 25 being rotated at an overdrive speed with respect to the shaft 11. With this condition of grade retard, an opening of the vehicle engine throttle generates a fluid head by means of the impeller blading 28 which counteracts the fluid head from the floater member 25. This reduces the torque absorbing qualities of the converter 15 so that the grade retarding condition may be controlled to a desirable level.

The first condition of grade retard may be established during rather high forward speeds of the vehicle. A very high percentage of the energy retarding the vehicle, such as on the order of 85 percent, is absorbed within the converter 15 rather than in any slipping clutches or brakes, and the capacity of the converter for this condition is so great that even on a very steep grade, the transmission is effective to vary substantially retard the vehicle. Due to the fact that the energy is taken in the hydraulic unit 15 rather than in mechanical elements, such as friction brakes and clutches, this grade retard condition may be used for substantial lengths of time, as in descending mountain grades, without harmful overheating of any parts of the transmission. Furthermore, since the energy is hydraulically absorbed, no breakage of parts of the transmission will occur even though the grade retard condition is established at relatively high forward speeds. Furthermore, this grade retard condition is effective, even though the vehicle engine is at the time inoperative. This is due to the fact that most of the energy is absorbed in the converter 15 under these conditions rather than being transmitted to the vehicle engine.

Referring to the table of FIG. 3; for the third level of grade retard, only the brake 18 is applied. This is the equivalent of performance range during times when the brake 22 is released due to forward rotation of the floater member 25. The sun gear 42 is held stationary, and the ring gear 43 constitutes the input member when the vehicle is moving down a grade, for example. The carrier 46, which is attached to the turbine 24, merely overspeeds the ring gear 43 by a certain amount, such as 46 percent, for the gear set previously mentioned. Thus the turbine 24 moves at this faster rate as compared to the speed of the ring gear; and the fluid energy caused by this rotation of the turbine, which causes clockwise toroidal movement of the fluid in the direction opposite to the arrows A is transmitted directly into the impeller 23 which in turn drives the vehicle engine to make use of the engine friction horsepower absorption for grade retard. This grade retard action is the least severe of the three grade retard conditions.

The embodiment of the invention illustrated in FIGS. 12, 13, and 14 is substantially the same as that illustrated in FIGS. 1 and 2 with the exception that an additional free wheeling brake 170 has been added. The one way unit 170 comprises a plurality of tiltable grippers 171 disposed between an outer race 172 fixed within the brake drum 55, and the grippers 171 are disposed on the outer race 61 for the free wheeling unit 22. The brake 17 is effective as before on the outer race 61.

Referring to FIG. 14, the conditions of reverse drive, drive range, low range (designated as hand shift) and the second condition of grade retard may be obtained by engaging the same friction engaging devices as is indicated in FIG. 3 for the first embodiment of the invention. In addition, as will be noted from FIG. 14, the embodiment shown in FIGS. 12 and 13 also provides an additional free wheeling low speed drive in which only the brake 17 is engaged and from which a change to drive range may be made simply and only by engaging the clutch 20.

The brake 17, when engaged, functions as before through the free wheeling brake 22 on the floater member 25, and the brake 17 also functions to brake the sun gear 42 through the one way engaging device 170 and the brake drum 55. Therefore in order to obtain a low speed drive from the drive shaft 10 to the driven shaft 11, engagement of the brake 18 is not necessary for holding the sun gear 42 against reverse rotation from the reaction of the gear set 16, and the power flow in low speed drive from the shaft 10 to the shaft 11 is the same as previously described in connection with the first embodiment. For a change to drive range, the clutch 20 is simply engaged causing the free wheeling unit 170 to overrun, and the power flow in drive range is the same as previously described in connection with the first embodiment. Due to the fact that it is not necessary to disengage the brake 18 and nearly simultaneously engage the clutch 20 for a change from performance range or low speed drive to drive range, the change of drive is exceedingly smooth. In the event that the same type of performance drive is desired in connection with the embodiment of FIGS. 12 and 13 as with the first embodiment, the brake 18 may be engaged along with the brake 17, and this is less of a free wheeling drive than is provided with only the brake 17 engaged.

Figure 15:
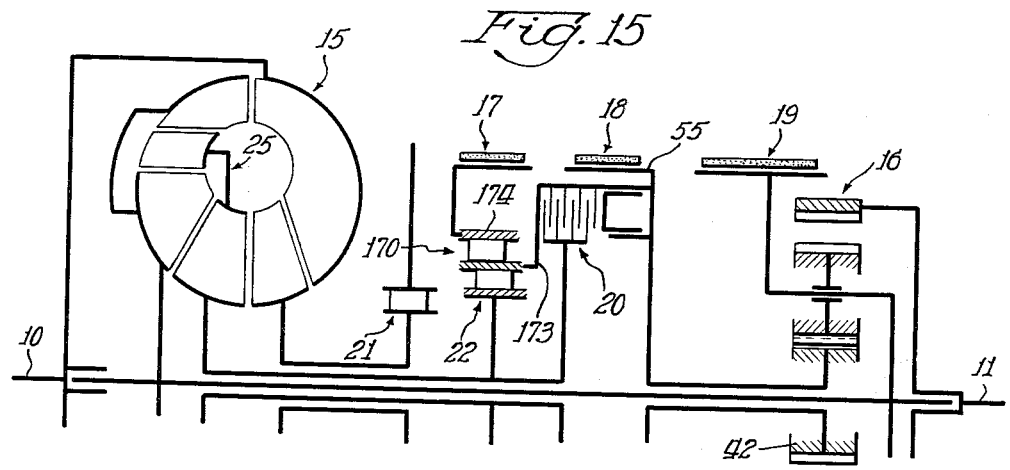
FIG. 15 is a schematic illustration of another modification of the invention.
Figure 16:
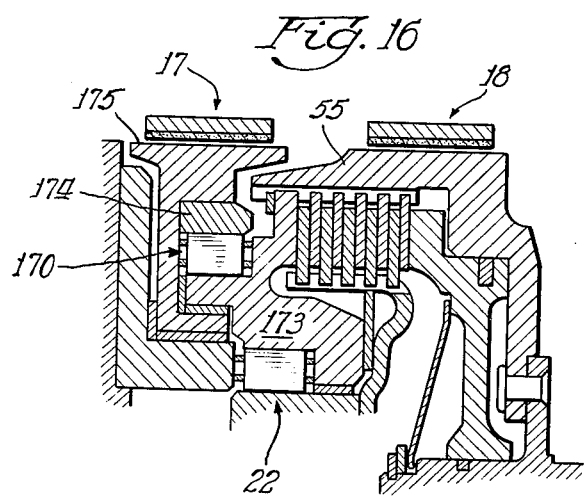
FIG. 16 is a partial longitudinal sectional view of the transmission illustrated in FIG. 15.

The embodiment of the invention illustrated in FIGS. 15 and 16 is much the same as that shown in FIGS. 12 and 13 with the exception that the connections to the free wheeling brake 170 are slightly modified. In the embodiment of FIGS. 15 and 16 a reformed outer race 173 is used for the one way brake 22, and this element serves also as an inner race for the one way unit 170. An outer race 174 for the one way unit 170 is fixed within a reformed brake drum 175 for the brake 17. The floater member 25 is braked in the embodiment of FIGS. 15 and 16 through both of the free wheeling units 170 and 22, and the single one way unit 170 is effective on the sun gear 42 through the member 173 splined within the drum 55.

The same conditions of drive are provided by the embodiment of FIGS. 15 and 16 as with the embodiment of FIGS. 12 and 13 and which are shown by the diagram of FIG. 14.

I wish it to be understood that my invention is not to be limited to the specific constructions and arrangements shown and described, except only insofar as the claims may be so limited, as it will be understood to those skilled in the art that changes may be made without departing from the principles of the invention. In particular, I wish it to be understood that although I have mentioned a planetary gear set with certain gear sizes providing a 1.46 ratio, gear sets providing other ratios might just as well be used within the scope of the invention. Furthermore, although I have illustrated torque converters, referring to FIG. 9, having a clutch point of .91 and a .63 speed ratio at which the floater member 25 begins to move forwardly, it will be understood that other torque converters, particularly those having blades with angles of input and output within the ranges listed above, may be utilized instead within the scope of the invention.

I claim:

1. In a transmission; the combination of a drive shaft; a driven shaft; a planetary gear set having two input elements and an output element; said output element being connected to said driven shaft; a hydraulic torque converter comprising a bladed impeller member connected to said drive shaft, first and second spaced bladed turbine members the first one of which receives fluid discharged by said impeller member, first and second spaced bladed floater elements on opposite sides of said second turbine member and a stator between said second floater element and said impeller member and forming a toroidal fluid circuit with said elements; a one-way brake mechanism for said stator; means rigidly connecting said turbine members; means rigidly connecting said floater elements; means for connecting said floater elements to one of said input elements and means for connecting said turbine members to the other of said input elements.

2. In a transmission; the combination of a drive shaft; a driven shaft; a planetary gear set having two input elements and an output element; said output element being connected to said driven shaft; a hydraulic torque converter comprising a bladed impeller member connected to said drive shaft, first and second spaced bladed turbine members the first one of which receives fluid discharged by said impeller member, first and second spaced bladed floater elements on opposite sides of said second turbine member, and a stator between said second floater element and said impeller member and completing a toroidal fluid circuit with said members; means for connecting said floater elements to one of said input elements, means for connecting said turbine members to the other of said input elements; one way braking mechanism for said stator, and one way braking mechanism for said floater elements and the said input element connected to said floater elements.

3. In a transmission; the combination of a drive shaft; a driven shaft; a planetary gear set having two input elements and an output element; said output element being connected to said driven shaft; a hydraulic torque converter comprising a bladed impeller member connected to said drive shaft, first and second spaced bladed turbine members the first one of which receives fluid discharged by said impeller member, first and second spaced bladed floater elements on opposite sides of said second turbine member, and a stator between said second floater element and said impeller member and completing a toroidal fluid circuit with said members; a clutch for connecting said floater elements to one of said input elements, a one way brake for said stator; and selectively operable one way engaging brake mechanism for said floater elements, and means for connecting said turbine members to the other of said input elements.

4. In a transmission; the combination of a drive shaft; a driven shaft; a planetary gear set having two input elements and an output element; said output element being connected to said driven shaft; a hydraulic torque converter comprising a bladed impeller member connected to said drive shaft, first and second spaced bladed turbine members the first one of which receives fluid discharged by said impeller member, first and second spaced bladed floater elements on opposite sides of said turbine member and a stator between said second floater element and said impeller member and completing a toroidal fluid circuit with said members; a clutch for connecting said floater elements to one of said input elements; a brake for said last named input element; a one way brake for said stator; selectively engageable one way braking mechanism for said floater elements; and means for connecting said turbine members to the other of said input elements; a brake for said other input element and said turbine members; the blading of said turbine and floater elements being such that said first floater element tends to rotate slower in the forward direction than said second floater element.

5. In a transmission, the combination of a drive shaft, a driven shaft, a hydraulic torque converter having an impeller and a turbine and a floater member and a stator, said impeller being connected to be driven from said drive shaft, a planetary gear set having three elements one of which is connected to said driven shaft and a second of which is connected to said turbine, a brake for said second element and turbine, and clutch mechanism for connecting said floater member and the third of said elements so that when said brake and said clutch are engaged said floater member drives said driven shaft through said planetary gear set.

6. In a transmission, the combination of a drive shaft, a driven shaft, a hydraulic torque converter having an impeller connected to said drive shaft and a turbine and a floater member and a stator, a planetary gear set having three elements one of which is connected to said driven shaft and another of which is connected to said turbine, a brake for said last named element for thereby braking said element and said turbine, a brake for the third of said elements, a clutch for connecting said last mentioned element and said floater member, and a selectively operable one way braking device for said floater member.

References Cited in the file of this patent

UNITED STATES PATENTS

| | | |
|---|---|---|
| 2,371,589 | Salerni | Mar. 13, 1945 |
| 2,456,328 | Schneider | Dec. 14, 1948 |
| 2,624,215 | McRae | Jan. 6, 1953 |
| 2,691,812 | Misch | Oct. 19, 1954 |
| 2,762,196 | Ullery | Sept. 11, 1956 |
| 2,762,197 | Ullery | Sept. 11, 1956 |
| 2,795,153 | Russell | June 11, 1957 |
| 2,883,881 | Baker | Apr. 28, 1959 |
| 2,944,441 | Russell | July 12, 1960 |
| 2,983,165 | Moore et al. | May 9, 1961 |
| 2,994,197 | Mamo | Aug. 1, 1961 |